(12) United States Patent
Saito et al.

(10) Patent No.: US 7,869,132 B2
(45) Date of Patent: Jan. 11, 2011

(54) IMMERSION MICROSCOPE OBJECTIVE AND LASER SCANNING MICROSCOPE SYSTEM USING SAME

(75) Inventors: Masayoshi Saito, Tokyo (JP); Eiji Yokoi, Tokyo (JP); Kenichi Kusaka, Tokyo (JP)

(73) Assignee: Olympus Corporation, Tokyo (JP)

( * ) Notice: Subject to any disclaimer, the term of this patent is extended or adjusted under 35 U.S.C. 154(b) by 237 days.

(21) Appl. No.: 12/173,111

(22) Filed: Jul. 15, 2008

(65) Prior Publication Data
US 2009/0027769 A1    Jan. 29, 2009

(30) Foreign Application Priority Data

| Jul. 17, 2007 | (JP) | 2007-186369 |
| May 27, 2008 | (JP) | 2008-138231 |
| Jul. 9, 2008 | (JP) | 2008-179449 |

(51) Int. Cl.
*G02B 21/02* (2006.01)
(52) U.S. Cl. .................. 359/659; 359/656; 359/368
(58) Field of Classification Search ......... 359/368–390, 359/656–661, 676–692
See application file for complete search history.

(56) References Cited

U.S. PATENT DOCUMENTS

| 5,502,596 | A * | 3/1996 | Suzuki ................. 359/657 |
| 7,215,478 | B1 * | 5/2007 | Hirata ................. 359/656 |
| 7,382,542 | B2 | 6/2008 | Wartmann |
| 7,486,445 | B2 * | 2/2009 | Konishi et al. ......... 359/656 |
| 2003/0043473 | A1 | 3/2003 | Okuyama |

FOREIGN PATENT DOCUMENTS

| JP | A-2002-31760 | 1/2002 |
| JP | B2-3283499 | 5/2002 |
| JP | A-2003-29157 | 1/2003 |
| JP | A-2004-317749 | 11/2004 |
| JP | A-2005-31507 | 2/2005 |

(Continued)

OTHER PUBLICATIONS

English translation of pp. 80-82 of "Introduction to Optics", first edition, eighth printing, published in Japanese by The Optronics Co., Ltd. on Mar. 29, 2002.

(Continued)

*Primary Examiner*—Thong Nguyen
(74) *Attorney, Agent, or Firm*—Arnold International; Bruce Y. Arnold

(57) ABSTRACT

An immersion microscope objective formed of thirteen or fewer lens elements includes, in order from the object side, first and second lens groups of positive refractive power, a third lens group, a fourth lens group having negative refractive power with its image-side surface being concave, and a fifth lens group having positive refractive power with its object-side surface being concave. The first lens group includes, in order from the object side, a lens component that consists of a lens element of positive refractive power (when computed as being in air) and a meniscus lens element having its concave surface on the object side. Various conditions are satisfied to ensure that images of fluorescence, obtained when the immersion microscope objective is used in a laser scanning microscope that employs multiphoton excitation to observe a specimen, are bright and of high resolution. Various laser scanning microscopes are also disclosed.

18 Claims, 33 Drawing Sheets

FOREIGN PATENT DOCUMENTS

| | | |
|---|---|---|
| JP | A-2005-43624 | 2/2005 |
| JP | A-2005-99131 | 4/2005 |
| JP | A-2005-189732 | 7/2005 |
| JP | A-2005-352021 | 12/2005 |
| JP | A-2008-40154 | 2/2008 |

OTHER PUBLICATIONS

English translation of pp. (171)41-(175)45 of Eiji Yokoi et al., "Industrial Info.—A new water immersion objective lens specifically designed for two-photon imaging", published in SAIBOU (The CELL) by New Science Co., Ltd. on Apr. 20, 2008.

* cited by examiner

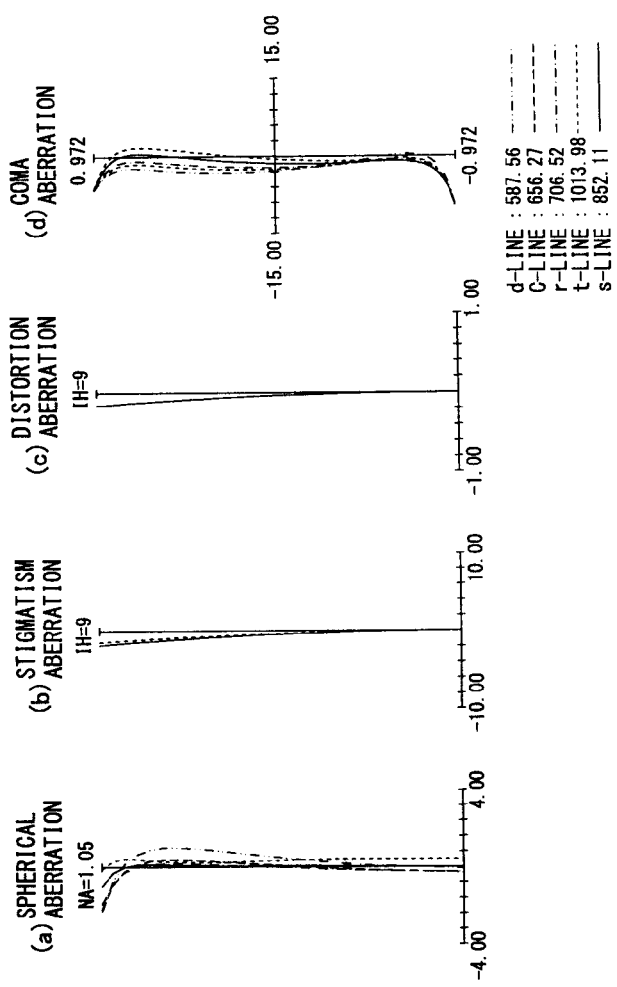
F I G. 1 4

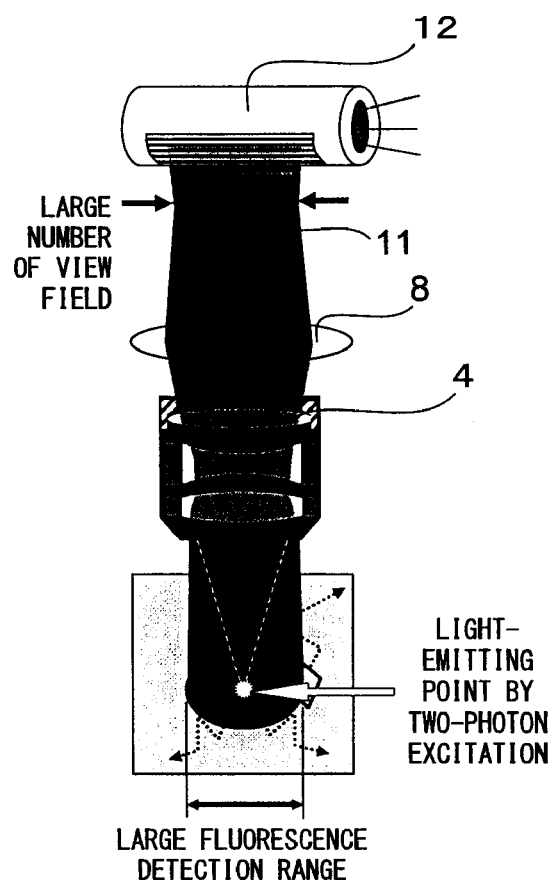
F I G. 3 1 A

IMMERSION MICROSCOPE OBJECTIVE AND LASER SCANNING MICROSCOPE SYSTEM USING SAME

CROSS REFERENCE TO RELATED APPLICATIONS

This application is based upon and claims the benefit of priority from the prior Japanese Patent Application No. 2007-186369 filed Jul. 17, 2007, No. 2008-138231 filed May 27, 2008, and JP2006-179449 filed Jul. 9, 2008, the entire contents of which are incorporated herein by reference.

BACKGROUND OF THE INVENTION

1. Field of the Invention

The present invention relates to an immersion microscope objective for use in a laser scanning microscope that uses multi-photon excitation.

2. Description of the Related Art

A known microscopic fluorescence observation means uses multiphoton excitation in fluorescence observation. During multiphoton excitation, a fluorescent object is illuminated with a light beam having wavelengths of integral multiples of an inherent absorption wavelength so as to cause excitation nearly equivalent to that caused by light having a wavelength equal to the inherent absorption wavelength. Multiphoton excitation is a non-linear phenomenon. For example, in the case of two-photon excitation, the excitation occurs at a probability proportional to the square of the intensity of the excitation light.

On the other hand, excitation light collected by a microscope objective lens has a light intensity that is inversely proportional to the square of the distance from the focal plane. Microscope multiphoton excitation occurs only in the vicinity of the focal point and thus fluorescence is emitted only from the focal plane.

Because of the above, a confocal pinhole, which is provided in the detection system of a common confocal microscope in order to shield the detector from fluorescence emitted anywhere other than at the focal plane, is unnecessary when using a multiphoton excitation laser scanning microscope. Advantageously, fluorescence in samples is subject to less discoloration because the excitation occurs only at the focal plane.

In multiphoton excitation, infrared light (that has longer wavelengths than light ordinarily used for excitation) is generally used as the excitation light. Generally speaking, light having longer wavelengths tends to scatter less (i.e., Rayleigh scattering). On the other hand, infrared excitation light reaches deep inside scattering samples such as living samples. This allows the deep parts of a living body to be made observable, as those parts are otherwise impossible to observe using only visible light. Furthermore, infrared light is less photo toxic than ultraviolet and visible light. This allows for observation of living samples with minimum damage.

For example, serotonin (a substance found in the brain) is self fluorescent, having absorption wavelengths in the ultraviolet range. However, ultraviolet light is highly photo toxic and does not reach deep inside the brain. In such circumstances, multiphoton excitation laser scanning microscopes work effectively. The ultraviolet light and infrared light differ in wavelength by a factor of approximately three. Thus, the infrared light can be used to excite serotonin by three-photon excitation.

As described above, multiphoton excitation fluorescence observation has significant merits and currently is a very effective type of microscopic observation.

However, microscopic observation using multiphoton excitation has some technical difficulties. For example, for multiphoton excitation to occur, two or more photons at a time must collide with a molecule of the fluorescent object and be absorbed. In order for this to occur, a significantly high photon density must be created at the focal point of the microscope objective lens. In other words, a microscope objective lens having a large numerical aperture with aberrations that are properly corrected must be used. As the excitation light is infrared light, it is important that aberrations of the microscope objective lens be favorably corrected for the infrared light.

For observation of the deep parts of a sample, aberrations resulting from the refractive index of the sample cannot be ignored. In order to avoid a deterioration of the fluorescence efficiency due to such aberrations, it is desirable that a correction collar be provided that corrects for aberrations that vary according to the depth of observation in the sample.

On the other hand, even though the excitation light is strong, only a small intensity of fluorescent light emerges from a sample. Therefore, the emerging fluorescent light has to be detected with a minimum loss. Thus, the microscope objective lens should be composed of a minimum number of lens elements and lens groups so as to optimize the optical path to the detector.

Furthermore, ultraviolet light should be detected in the case of three-photon excitation. However, conventional optical glass has a low transmittance to ultraviolet light. Therefore, the microscope objective lens should be constituted by specific types of optical glass that have a high transmittance to ultraviolet light.

A microscope that uses multiphoton excitation is often used in conjunction with a technique known as patch clamping that is widely used in cellular biology studies. When used in this manner, a sufficient working distance has to be reserved between the leading end of the immersion microscope objective and the sample. In other words, a large working distance and a sufficient access angle at the leading end of the immersion microscope objective need to be provided.

The excitation light is infrared light and the emerging fluorescence lies within the visible and ultraviolet ranges. Therefore, the fluorescence to be detected is likely to be subject to Rayleigh scattering by the sample. Consequently, light emerging from one point may become diffused before it enters the immersion microscope objective. Therefore, it is desirable that the immersion microscope objective be provided with a large field of view so as to collect the scattered fluorescence without loss.

When the field of view of the immersion microscope objective is extended, the pupil diameter of the immersion microscope objective increases proportional to it. Even if it is assumed that an immersion microscope objective having a very large input pupil diameter is developed, the performance cannot be displayed unless the input laser beams of the confocal microscope device fill the pupil diameter in the input pupil position of the immersion microscope objective. Therefore, Japanese Laid-Open Patent Application No. 2008-040154 proposes a technique for adjusting the input beam diameter in such a way as to approximately match the pupil diameter of the immersion microscope objective with an input beam diameter. According to this technique, the confocal microscope device can adjust the input beam diameter in such a way as to approximately coincide with the pupil diameter of the immersion microscope objective. However, since the input beam diameter is adjusted before beams enter a laser beam deflection means (a two-dimensional scanning means), the maximum input beam diameter is defined by the laser beam deflection means.

In order to expand this, it is necessary to increase the device size of the laser beam deflection means such as a galvano-mirror and the like. However, the larger the size of the galvano-mirror becomes, the larger a deflection angle for scanning the specimen range becomes to reduce the scanning speed. In a resonant galvano-mirror provided with two galvano-mirrors near a position conjugate with the aperture position and capable of two-dimensional scanning, the distance must be extended in order to avoid the interference between the two galvano-mirrors. Thus, it deviates from the ideal position to increase illumination unevenness.

Therefore, it is important to combine an optimum immersion microscope objective with the maximum input beam diameter defined by the laser beam deflection means of the confocal microscope device.

SUMMARY OF THE INVENTION

The present invention relates to an immersion microscope objective for use in a laser scanning microscope that uses multiphoton excitation, as well as a multiphoton excitation laser scanning microscope system that uses such an immersion lens. The purpose of the present invention is to provide an immersion microscope objective that ensures both a bright fluorescence and high resolution images in a multiphoton excitation laser scanning microscope, and a laser scanning microscope system that is optimized for multiphoton excitation observation.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 14A-14D show the spherical aberration, astigmatism, distortion, and coma, respectively, of the immersion microscope objective shown in FIG. 3 when the specimen thickness is 0.3 mm;

FIG. 31A is a schematic illustration of the detection efficiency of a detection optical system having a large field of view in a laser scanning microscope system that uses the present invention.

DESCRIPTION OF THE PREFERRED EMBODIMENTS

Figure 1:
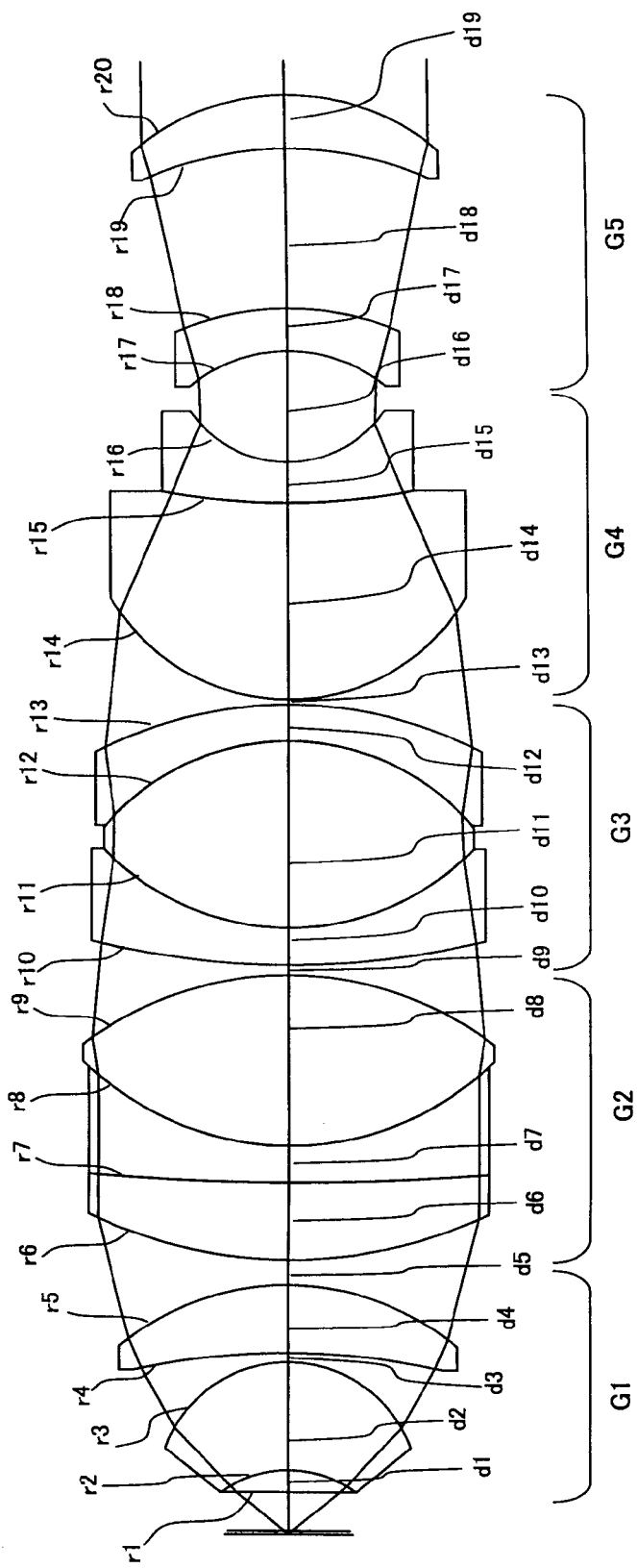
FIG. 1 is a cross-sectional view of the lens element and lens group configuration of an immersion microscope objective according to Embodiment 1 of the present invention.

The term "lens group" is defined in terms of "lens elements" and "lens components" as explained below. The term "lens element" is herein defined as a single transparent mass of refractive material having two opposed refracting surfaces, which surfaces are positioned at least generally transversely of an optical axis. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacing between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is used herein to define an assembly of one or more lens components that are fixed or are movable as a single unit. The term "movable lens group" is used herein to define an assembly of one or more lens components in optical series and with no intervening lens components that is movable along an optical axis as a single unit relative to other lens components or an image plane of the immersion microscope objective. Thus, for example, a lens group may be stationary or movable along the optical axis with respect to an image plane of the immersion microscope objective, and stationary lens elements of the immersion microscope objective may define different lens groups. More specifically, as an example, a lens group nearest a specimen and a lens group nearest the image plane may be stationary but they are not part of the same lens group because they are separated by other lens components that belong to other lens groups.

An immersion microscope objective according to the present invention includes, in order from the object side, a first lens group having positive refractive power, a second lens group having positive refractive power, a third lens group having a low refractive power, a fourth lens group having negative refractive power with its surface nearest the image side being concave, and a fifth lens group having positive refractive power with its surface nearest the object side (i.e., nearest the specimen) being concave, characterized by the fact that the first lens group has a cemented lens consisting of a positive lens component on the side nearest the object cemented to a meniscus lens component having its concave surface on the object side. Moreover, the immersion microscope objective of the present invention includes no more than thirteen lens elements; and the following conditions are satisfied:

$$0.75 < h1/h0 < 1 \qquad \text{Condition (1)}$$

$$0.4 < h2/h1 < 0.6 \qquad \text{Condition (2)}$$

$$0.8 < h3/h1 < 1.3 \qquad \text{Condition (3)}$$

where h0 is the largest ray height on any lens surface in the microscope objective immersion lens, h1 is the marginal ray height on the surface of the fourth lens group nearest the object side, h2 is the marginal ray height on the surface of the fourth lens group nearest the image side, and h3 is the marginal ray height on the surface of the fifth lens group nearest the image side.

Also, it is preferable that the fourth lens group consists of a doublet, the fifth lens group includes at least one meniscus lens with its concave surface on the object side, and at least one of the following conditions is satisfied:

$$-0.5 < f4/f5 < 0.0 \qquad \text{Condition (4)}$$

$$Ro4/h1 < 1.4 \qquad \text{Condition (4')}$$

where f4 is the focal length of the fourth lens group, f5 is the focal length of the fifth lens group, and Ro4 is the radius of curvature of the surface of the fourth lens group nearest the object side.

Further, it is preferable that the third lens group consists of a cemented lens and that the third lens group moves along the optical axis relative to the second and fourth lens groups for correcting aberrations resulting from different thicknesses of the specimen and the cover glass CG.

In addition, it is desired that the third lens group consists of a triplet and the following conditions are satisfied:

$$|f/f3| < 0.1 \qquad \text{Condition (5)}$$

$$|f2/f3| < 0.6 \qquad \text{Condition (6)}$$

where f2 is the focal length of the second lens group, f3 is the focal length of the third lens group, and f is the focal length of the immersion microscope objective.

It is preferable that the third lens group consists of a triplet and that the cemented lens of the third lens group satisfies the following condition:

$$0.85 < |\beta3| < 1.1 \qquad \text{Condition (7)}$$

where

β3 is the magnification of the third lens group.

It is also preferable that the second lens group consists of a cemented lens that is movable along the optical axis relative to the first and third lens groups for correcting aberrations resulting from different thicknesses of the specimen and the cover glass CG.

In such a case, it is also desirable that the second lens group satisfies the above Condition (6) as well as the following condition:

$$0.1 < f/f2 < 0.3 \quad \text{Condition (8)}$$

where f and f2 are as defined above.

The above purpose of the present invention is achieved by an immersion microscope objective characterized by satisfying the following conditions:

$$Do/f > 10 \quad \text{Condition (9)}$$

$$NA \times f > 6 \text{ mm} \quad \text{Condition (10)}$$

where

Do is the distance in mm between the specimen surface and the mounting position of the immersion microscope objective, NA is the object-side numerical aperture of the immersion microscope objective, and f is in mm.

It is also preferable that a lens group constitute what is herein termed a 'movable lens group' that moves along the optical axis relative to the lens groups before and after the movable lens group and relative to the image plane for correcting aberrations resulting from differences in the thicknesses of the specimen and the cover glass CG.

In addition, it is preferable that the following condition is satisfied:

$$do + di > 1 \text{ mm} \quad \text{Condition (11)}$$

where do is the distance (in mm) between the movable lens group and the adjacent lens group on the object-side of the movable lens group, and di is the distance (in mm) between the movable lens group and the adjacent lens group on the image-side of the movable lens group.

In such a case, it is also desirable that the movable lens group satisfies the following condition, which is identical to Condition (7):

$$0.85 < |\beta s| < 1.1 \quad \text{Condition (12)}$$

where

βs is the magnification of the moveable lens group.

Moreover, in the above structure, it is also desirable that the following conditions be satisfied:

$$0.02 \text{ mm}^{-1} < (n2-n1)/ra < 0.08 \text{ mm}^{-1} \quad \text{Condition (13)}$$

$$0.26 < dt1/f \quad \text{Condition (14)}$$

$$dt2 > 0.4 \text{ mm} \quad \text{Condition (15)}$$

where ra is the radius of curvature in mm of the cementing surface in said cemented lens included in the first lens group, n1 is the refractive index of a first lens element from the object side of the cemented lens in the first lens group, n2 is the refractive index of a second lens element from the object side of the cemented lens in the first lens group, dt1 is the working distance, in mm, of the immersion microscope objective, and dt2 is the air distance, in mm, between said cemented lens component in said first lens group and a subsequent lens element in said first lens group.

It is also desirable that the following conditions be satisfied:

$$nd5p > 1.65 \quad \text{Condition (16)}$$

$$25 < vd5p < 40 \quad \text{Condition (17)}$$

$$15 < vpa - vna < 40 \quad \text{Condition (18)}$$

where nd5p is the refractive index, at the d-line, of a positive lens element in the fifth lens group, vd5p is the Abbe number (relative to the d-line) of said positive lens element in the fifth lens group, vpa is the average of the Abbe numbers (measured relative to the d-line) of the lens elements of the immersion microscope objective having positive refractive power (computed for each lens element being in air), and vna is the average of the Abbe numbers (measured relative to the d-line) of the lens elements of the immersion microscope objective having negative refractive power (computed for each lens element being in air).

More particularly, it is desirable that the immersion microscope objective uses water as the immersion liquid. It is further preferable that the immersion microscope objective is formed of lens elements formed of optical material having an internal transmittance of 50% or higher for light of 340 nm when the optical material has a thickness of 10 nm and that the total number of lens elements be 15 or fewer. It is also preferable that aberrations are corrected for wavelengths that range from 700 nm to 1100 nm.

The reason for using the above structure and its efficacy will now be described. Providing the first lens group with positive refractive power reduces the diverging angle of a large numerical aperture light beam that emerges from an object so as to converge the light flux while balancing the spherical aberration and field curvature. Providing the second lens group with a low positive refractive power nearly collimates the light flux while correcting the spherical aberration. The third lens group, that accommodates a large maximum ray height, corrects coma and spherical aberrations without significantly reducing the maximum ray height. Providing the lens surface on the object side of the fourth lens group with a large positive refractive power and providing the lens surface on the image side of the fourth lens group with a large negative refractive power significantly reduces the maximum ray height while correcting coma aberration and astigmatism. The lens surface on the object side of the fifth lens group has negative refractive power that is used to balance coma aberrations generation over a wide range of wavelengths and uses its lens surface on the image side of the fifth lens group that has positive refractive power to collimate the diverging beam.

High order spherical and coma aberrations are substantial problems in correcting aberrations of a beam having a large numerical aperture. When spherical and coma aberrations of third order are expressed as lateral aberrations, they are proportional to the cube and square of the ray height, respectively, and it is useful to correct them at a large ray height. When Condition (1) is satisfied, the ray height is maximized at the second lens group and this is generally maintained up to the object-side surface of the fourth lens group, whereby high order spherical and coma aberrations can efficiently be corrected.

When the value of h1/h0 in Condition (1) does not satisfy the lower limit (i.e., 0.75), the beam passes through the third lens group with a small height; therefore, high order spherical and coma aberrations are not sufficiently corrected. On the other hand, when the value of h1/h0 in Condition (1) equals or exceeds the upper limit (i.e., 1), the fourth lens group refracts the beam with a high positive refractive power. Therefore, spherical and coma aberrations of fifth or higher order occur and they are not sufficiently corrected by the other groups. Furthermore, when the value of h1/h0 in Condition (1) equals or exceeds the upper limit in Condition (1), the fourth lens group significantly de-centers the optical system.

When the value of h2/h1 in Condition (2) equals or exceeds the upper limit (i.e., 0.6), the fourth lens group has a concave surface with an insufficient negative power, resulting in the Petzval sum being too high and astigmatism being poorly corrected. When the value of h2/h1 in Condition (2) is less than or equal to the lower limit (i.e., 0.4), the fourth lens group has a concave surface with too much negative refractive power, resulting in the Petzval sum being too high and resulting in high-order coma aberration, which impairs off-axis imaging performance.

When the value of h3/h1 in Condition (3) is less than or equal to the lower limit (i.e., 0.8), the fifth lens group has insufficient refractive power, making it difficult to correct coma aberration over a wide range of wavelengths. On the other hand, when the value of h3/h1 in Condition (3) is equal to or exceeds the upper limit (i.e., 1.3), a positive lens element in the fifth lens group produces significantly large spherical aberration and coma, and it becomes difficult to correct these aberrations using other lens groups.

Condition (4) defines the power balance between the fourth and fifth lens groups that are positioned on opposite sides of the Gaussian image plane. It is important in terms of performance to balance aberrations by satisfying Condition (4). When the value of f4/f5 in Condition (4) is less than or equal to the lower limit (i.e., −0.5), the fourth lens group has a low negative refractive power, resulting in the Petzval sum being too high. On the other hand, when the value of f4/f5 in Condition (4) equals or exceeds the upper limit (i.e., 0.0), the fourth lens group has a high negative refractive power, causing large coma aberration. It is difficult to correct such large coma aberration by using the other lens groups.

Condition (4') defines the power generated by the surface of the fourth lens group nearest the object side versus the marginal ray height at the surface of the fourth lens group nearest the object side. When the value of Ro4/h1 in Condition (4') is great than or equal to 1.4, the beam enters the image-side concave surface of the fourth lens group at a modest incident angle and a high negative refractive power is not generated, resulting in the Petzval sum being too high and astigmatism being poorly corrected.

Condition (5) defines the power of the third lens group in relation to the power of the immersion microscope objective. When the absolute value of f/f3 in Condition (5) is not less than 0.1, the third lens group has an increased power and the marginal light enters the fourth lens group at a small incidence angle, resulting in the negative refractive power of the fourth lens group being insufficient, the Petzval sum being too high, and astigmatism being poorly corrected.

Condition (6) defines the power balance between these second third lens groups. When the absolute value of f2/f3 in Condition (6) is not less than 0.6, the second lens group has a refractive power that is too small so that spherical aberration is not sufficiently corrected. If the third lens group is used to correct the insufficiently corrected spherical aberration, coma aberration is excessively corrected, resulting in imbalanced performance.

Condition (7) will now be discussed. There are many known techniques to move a lens group so as to correct the spherical aberration resulting from the thicknesses of the cover glass and specimen. Generally, when the lens group is moved, the focal point of the immersion microscope objective shifts, becoming out of focus. In order to observe the specimen at a specific depth with optimum imaging performance, the correction of spherical aberration by a correction collar of the immersion microscope objective and the correction of the focusing point by the microscope should be alternately repeated. However, this is a very cumbersome task. In order to avoid such a task, for example, Japanese Laid-Open Patent Application No. 2005-352021 discloses an objective lens that subjects the focusing point to limited shifting during the correction collar operation. In that objective lens, considering the influence of the movable lens group on spherical aberration, a condition for limited focus point shifting is that the movable group has a magnification from −1.8 to −1.1. In the immersion microscope objective of the present invention, it is desirable to satisfy Condition (7) in order to easily correct spherical aberration. When the absolute value of $\beta s$ in Condition (7) is greater than or equal to the upper limit (i.e., 1.1), the focusing point is shifted too far to the image side as the movable group moves toward the specimen during a specimen observation, requiring readjustment of the focusing point. On the other hand, when the absolute value of $\beta s$ in Condition (7) is less than or equal to the lower limit (i.e., 0.85), the focusing point is shifted too much toward the specimen as the movable lens group moves toward the specimen during the observation, requiring readjustment of the focusing point.

Condition (8) will now be discussed. When the value of f/f2 in Condition (8) equals or exceeds the upper limit (0.3), the second lens group has too small a focal length in relation to the focal length of the immersion microscope objective. The second lens group is positioned where the beam has large ray heights and thus provides a large refractive power. Although the ray heights can be reduced, large spherical aberration and coma aberration would then be produced that cannot be corrected by other lens groups. On the other hand, when the value of f/f2 in Condition (8) is less than or equal to the lower limit (i.e., 0.1), the second lens group has a refractive power that is too low in relation to that of the focal length of the entire immersion microscope objective and the ray height must be increased. Therefore, the third and fourth lens groups would each require high positive refractive power in order to reduce the ray height. This would greatly increase the high order spherical and coma aberrations, and would result in a failure to ensure sufficient correction of these high order aberrations.

Condition (9) defines an appropriate focal length f in relation to the distance Do between the specimen surface and the mounting position of the immersion microscope objective. A low magnification objective lens (i.e., one having a large focal length f) has a large field of view. Therefore, the focal length f) should be increased to correct aberrations for sustained flatness of the image surface. When the value Do/f in Condition (9) does not exceed 10, it is difficult to ensure a sustained flatness of the image surface.

Condition (10) defines an appropriate numerical aperture according to the magnification of the immersion microscope objective. When the value NA×f in Condition (10) does not exceed 6, the immersion microscope objective has an exit pupil diameter that is too small and a sufficiently large numerical aperture for a large field of view and a high resolution observation is not ensured. Fine specimen structures such as spines in the cerebral nerves cannot be imaged. In addition, fluorescence observations have insufficient brightness. If the magnification is increased while a large numerical aperture is maintained, scattered light generated during in vivo fluorescence observation cannot be picked up due to insufficient brightness.

For the observation of in vivo deep parts, living media are considered to have a refractive index range of approximately 1.35 to 1.4, which is higher than that of the immersion liquid (i.e., water) that is used to view the images using the immersion microscope objective. Therefore, in an observation of deep parts, spherical aberration occurs according to the product of the difference in refractive index and the depth from the in vivo surface, thereby deteriorating the imaging performance. When the movable lens group is moved to correct for the spherical aberration, coma aberration accordingly occurs, deteriorating the performance off-axis. Thus, it is desirable, in the lens groups immediately before and after the movable lens group, that the difference in the coma aberration correction coefficients is small and that the difference in the spherical aberration correction coefficients is large.

Lateral aberrations up to that of third-order, in practice, roughly determine the imaging performance, and are given in "Introduction to Optics", Version 1, 8th Printing, Mar. 29, 2002, (Optronics) at page 82. According to this publication, spherical aberration is proportional to the cube of the ray height h, and coma aberration is proportional to the product of $\tan \omega$ and $h^2$ (where $\omega$ is the incident angle to the object-side surface of a lens). Then, they are presumably functions of h and $\omega$ and the correction coefficients are obtained by differentiating the functions with respect to h and $\omega$. The spherical aberration is differentiated with respect to h and $\omega$ to yield $3h^2$. The coma aberration is differentiated with respect to h and $\omega$ to yield $2h \tan \omega + h^2 (1 + \tan 2\omega)$.

Condition (11) ensures a high correction capability of the correction collar. By creating large spaces before and after the correction collar, spherical aberration can be corrected even if it is large. When the value is smaller than the lower limit (i.e., unity), a large spherical aberration resulting from mis-matched indices of refraction of the immersion liquid and the specimen during observation of in vivo deep parts will not be sufficiently corrected.

When the absolute value of $\beta s$ in Condition (12) is larger than the upper limit (i.e., 1.1), the focus point significantly shifts toward the image side and it becomes necessary to readjust the focus point when the movable lens group is moved to the specimen side during observation.

Furthermore, it is important for the user who tries to understand in vivo functions to obtain information through changes in electric signals in the course of in vivo observation. The signals are measured generally by 'patch clamping', which is a technique in which fine electrode needles on the tilted surfaces at the leading end of the immersion microscope objective are inserted into a specimen to detect electric signals. For patch clamping, it is important that the immersion microscope objective has a small diameter and a sharp leading end.

Condition (13) of the present invention defines the powers of the positive and negative lens elements in the first lens group. When the value of $(n2-n1)/ra$ is larger than the upper limit, (0.08), light emerges from the specimen at a small angle and has a small height in the second and third lens groups, resulting in high order spherical and coma aberrations being insufficiently corrected. On the other hand, when the value of $(n2-n1)/ra$ is smaller than the lower limit (0.02), marginal light emerges from the specimen at a large angle and the immersion microscope objective has a large diameter leading end, eliminating the capability of insertion of fine electrode needles as required in patch clamping.

Condition (14) controls the distance dt1 between the object (i.e., the specimen) surface and the first lens surface. If the value of dt1/f does not exceed 0.26, the distance between the specimen surface and the first surface of the immersion microscope objective is such that it becomes difficult to insert the fine electrode needles used in patch clamping, causing inconvenience for use and making it impossible to observe in vivo deep parts.

Condition (15) ensures that a sufficient space for a lens frame exists. When the value of dt2 is not larger than 0.4, there will be insufficient space to accommodate a lens frame for supporting the lens elements in the first lens group. In addition, the frame structure will outrange the minimum marginal light angle that is determined by the numerical aperture; therefore the immersion microscope objective will not be able to have a sharp end.

Condition (16) ensures that coma generated by the fifth lens group may be adequately corrected. When the value nd5p is not greater than 1.65, coma aberration in the fifth lens group becomes large and it becomes difficult to correct this coma using the other groups.

Condition (17) ensures that lateral color generated in the first to fourth lens groups can be corrected by the fifth lens group, despite the immersion microscope objective of the present invention using a relatively small number of lens elements. When the value vd5p in Condition (17) is not less than the upper limit (i.e., 40), lateral color is not sufficiently corrected. When the value vd5p does not exceed the lower limit (i.e., 25), excessive correction of lateral color occurs.

Condition (18) ensures that axial chromatic aberration in the near infrared range from 700 to 1100 nm is adequately corrected. When the value of vpa–vna in Condition (18) is not less than the upper limit (i.e., 40), the best focusing point for longer wavelengths shifts to a shallower point and thus it deviates too much from the best focusing point for shorter wavelengths. On the other hand, when the value of vpa–vna is not larger that the lower limit, (i.e., 15), the best focusing point for longer wavelengths in the near-infrared range shifts to a deeper point and deviates too much from the best focusing point for shorter wavelengths.

In another aspect of the present invention, in an immersion microscope objective having a plurality of lens groups, a lens group on the side nearest the object is a cemented lens having its cemented surface with a convex surface on the image side and a lens group on the side second-nearest the object is a single positive lens. They are characterized by meeting the following conditions:

$$0.15 > n1 - nw > 0.05 \quad \text{Condition (19)}$$

$$4 > rb/dt3 > 0.9 \quad \text{Condition (20)}$$

where rb is the radius of curvature of the cemented surface of the cemented lens, n1 is the refractive index of the first lens from the object side, nw is the refractive index of a medium filling the space between the specimen and the lens on the side nearest the object and dt3 is a distance between the object surface and the cemented surface.

These conditions accommodate space for the lens frame by curving light on the cemented surface while suppressing aberrations by approximating the refractive index of a lens on the side nearest the object side close to the refractive index of the immersion medium.

When the value of $(n1-nw)$ in Condition (19) exceeds the upper limit, a beam entering the immersion microscope objective has a large refraction and its influence on aberrations increases. Since the immersion microscope objective of the present invention has low magnification and a large numerical aperture, this aberration cannot be neglected.

When the value of (n1−nw) in Condition (19) is smaller than the lower limit, a beam entering the immersion microscope objective has small refraction and the ray height increases, failing for the immersion lens to have a sharp leading end.

When the value of rb/dt3 in Condition (20) exceeds the upper limit, the curvature of the cemented surface decreases and it becomes difficult to correct spherical aberrations. Although this cemented surface is effective in correcting spherical aberrations, its efficiency decreases when the curvature decreases.

When the value of rb/dt3 in Condition (20) is smaller than the lower limit, it is advantageous from the viewpoint of aberration correction. However, the immersion microscope objective has a bold leading end since light jumps up on this cemented surface.

It is preferable for the immersion microscope objective of the present invention to meet the following condition:

$$fs/f < 2.8 \quad \text{Condition (21)}$$

where fs is the focal length of the cemented lens and f is the focal length of the entire immersion microscope objective.

When the value of fs/f in Condition (21) exceeds the upper limit, the cemented lens has a long focal length and it becomes difficult for the immersion microscope objective to have a sharp leading end due to the increased influence of the ray height.

It is also preferable for the immersion microscope objective of the present invention to meet the following condition:

$$fs/f < 1.99 \quad \text{Condition (21')}$$

By meeting the above condition, the ray height can be more favorably reduced.

The immersion microscope objective of the present invention is characterized by meeting the following condition:

$$dt5 - dt4 > 2.8 \text{ mm} \quad \text{Condition (22)}$$

where dt4 is the thickness in mm of a lens on the object side of the cemented lens and dt5 is the thickness in mm of a lens on the image side of the cemented lens.

Condition (22) provides a condition for suppressing the ray height to a low level in a lens element on the image side of a cemented lens. When the value of (dt5−dt4) in Condition (22) is smaller than the lower limit, the ray height cannot be sufficiently suppressed and it becomes difficult for the leading end to be sharp.

Furthermore, in the immersion microscope objective of the present invention it is preferable for each lend of the lens group second-nearest the object to be bi-convex.

Not only the cemented lens at the leading end but also lens after it give influences on the sharpening of the leading end. For a lens second-nearest the object, a meniscus lens having its concave surface on the object is often used. However, a meniscus lens having its concave surface on the object interferes with the lens frame for fixing a cemented lens before it, resulting in it becoming difficult to sharpen the leading end. The interference with the lens frame is reduced by using a lens having a bi-convex surface as a lens second-nearest the object, thereby making it easy to sharpen the leading end.

Preferably, an immersion microscope objective having the above structure is used in a laser scanning microscope system that includes: a non-confocal detection optical system, a galvanometer mirror, a pupil projection lens, an imaging lens, a control-means for determining a desired spherical aberration correction amount (e.g., a microchip having a look-up table that relates the refractive index and the depth of the specimen region observed to the required position of the movable group), and a moving means (i.e., a lens drive unit) for moving the movable lens group (other than manually) based on the output of the control means, wherein scanning may be conducted in the depth direction.

Japanese Laid-Open Patent Application No. 2005-43624 discloses a method for storing the refractive indices of specimens to be observed, having previously determined the corresponding moving rate of a movable lens group that is moved for correcting aberrations. Japanese Laid-Open Patent Application No. 2005-31507 discloses a microscope system in which the focusing point is corrected in consideration of the focusing point shift resulting from movement of the lens groups. When using an immersion microscope objective having structures according to these disclosures, the focusing point does not shift in association with a movement of the lens groups. With the rotation rates of the correction collar according to the refractive indices of specimens being stored, a laser scanning microscope system with which high resolution observation images of deep parts are easily obtained can be configured using an existing laser scanning microscope system.

A multiphoton excitation microscope is often used to observe specimens, such as brains, that scatter light when observed using such a microscope. Observing the deep parts of such specimens is similar to observing these specimens through a diffusing plate. Therefore, the scattered light enters the immersion microscope objective from an extended region on the specimen surface. In order to observe multiphoton-excited fluorescence from deep parts of such a specimen, it is desirable that the immersion microscope objective have a lower magnification for the same numerical aperture. Because a larger observation range is available at a low magnification, more scattered fluorescence can be detected the lower the magnification.

In a multiphoton excitation laser scanning microscope, fine structures such as spines of the cerebral nerves may be stimulated. In such a case, high resolution is necessary. Thus, illumination light is required to fill the pupil diameter of the immersion microscope objective in order to ensure a proper image resolution. Therefore, the immersion microscope objective of the present invention requires a high magnification, as otherwise the pupil is not tilled.

More specifically, the numerical aperture necessary for exciting spines of the cerebral nerves is approximately 0.85 to 1.15. If it is lower than this range, a resolution for exciting only spines is not obtained. If it is higher than 1.15, it is difficult to provide sufficient work space to insert the electrodes into the cerebral nerves during patch clamping. Thus, there is a trade-off in a multiphoton excitation laser scanning microscope between efficient detection of fluorescence from scattering objects and obtaining high resolution images. However, the following structure allows for both bright fluorescence and high resolution images to be provided. Namely, providing a laser scanning microscope system having a non-confocal detection system wherein the beam diameter entering the immersion microscope objective is substantially equal to the immersion microscope objective pupil diameter, while at the same time making the fluorescence detection range of the non-confocal detection optical system be larger than the laser scanning range on the specimen ensures both sufficient brightness and sufficient resolution.

When living specimen are observed, generally immersion liquid is used to prevent the living specimen from changing in quality due to drying. Furthermore, in order to suppress damages to an observation specimen and to detect weak fluorescence, it is important for the numerical aperture to be large. Immersion liquid has advantages in increasing the numerical aperture than a drying system. Therefore, it is preferable to use an objective immersion lens.

When a somewhat larger immersion microscope objective pupil diameter against the maximum input beam diameter determined by the laser beam deflection means is selected, the input beam cannot fill the immersion microscope objective pupil diameter, resulting in a small practical NA (a numerical aperture defined by light flux entering a specimen) and low resolution.

Furthermore, a somewhat smaller immersion microscope objective pupil diameter against the maximum input beam diameter determined by the laser beam deflection means is selected, NA decreases and resolution deteriorates. Alternatively, since the focal length is shortened, the magnification of the immersion microscope objective decreases. Thus, the field of view to be detected is narrowed, the detection efficacy of fluorescence scattered by the specimen deteriorates and dark images are obtained. Furthermore, laser beams dropping off the pupil diameter are wasted without contributing to excite fluorescence, thereby reducing the excitation intensity.

Thus, when an immersion microscope objective whose pupil diameter is substantially equal to the maximum input beam diameter determined by the laser beam deflection means, relatively bright and high resolution images can be obtained on the specimen surface.

The following structure may also be provided: a laser scanning microscope system having a laser beam deflection means such as a scanning mirror, a pupil projection lens, an imaging lens, and an immersion microscope objective wherein a non-confocal detection system is provided and the following condition is satisfied:

$$0.9 < (2 \times NA \times f)/(S \times ft1/fp1) < 1.1 \qquad \text{Condition (23)}$$

where

S is the size in mm of an effective diameter of the laser beam deflection means, ft1 is the focal length in mm of the imaging lens, and fp1 is the focal length in mm of the pupil projection lens.

In this case, for example, if a galvano-mirror is used for the laser beam deflection means, S is the maximum diameter of a circle inscribed in the mirror.

Condition (23) defines the exit diameter size of the laser beam from the laser beam deflection means and the immersion microscope objective pupil diameter (which equals 2×NA×f). When Condition (23) is satisfied, high resolution observation is available. When the value is larger than the upper limit of Condition (23), a small diameter light flux meets the immersion microscope objective pupil diameter after light passes through the laser beam deflection means and reaches the rear end of the immersion microscope objective, failing to sufficiently increase the effective numerical aperture in the imaging optical system of the laser scanning microscope. On the other hand, when the value is smaller than the lower limit of Condition (23), the immersion microscope objective has a small pupil diameter. Even if the light flux diameter meets the lens pupil diameter, the objective lens has a higher magnification. Therefore, the detection field of view is narrowed. In such a case, the observation light scattered by the specimen will have low collection efficiency.

In such a case, the lower limit comes 66% (=(0.9/1)^4) of the ideal value since the detection of fluorescence is brighter in proportion to the 4th power of the numerical aperture. If the value is smaller than this, images of dark part in living specimens cannot be obtained.

As to the upper limit (i.e, 1.1), the effective NA becomes 91% of the NA of the immersion microscope objective (=1/1.1). The diffraction limit extends and resolution deteriorates. When this value is larger than it, fine 3-dimensional structures, such as neuron and the like, cannot be accurately observed.

More preferably, Condition (23) can be modified to be more strict, as follows:

$$0.95 < (2 \times NA \times f)/(S \times ft1/fp1) < 1.05 \qquad \text{Condition (23')}.$$

The lower limit of Condition (23') becomes 81% (since $(0.95/1)^4 = 0.81$) of the ideal value (i.e., 1). If this value is larger than the lower limit, more brightness is secured when the dark body part of a living deep part is observed.

As to the upper limit of Condition (23') being 1.05, when the value of (2×NA×f)/(S×ft1/fp1) is larger than the upper limit, fine 3-dimensional structures, such as neurons and the like, cannot be accurately observed.

Especially, when a specimen that scatters light well, such as the brain and the like, is observed using a multi-photon excitation microscope, such a specimen becomes very dark due to scattering when the depth is larger than 300~400 μm and thus it becomes difficult to obtain images even if the laser power is increased up to the maximum limit. Therefore, it is important to meet the range of Condition (23') where brightness and resolution are almost ideal.

In the above laser scanning microscope, it is also preferably characterized by providing the immersion microscope objective with a means for correcting the change of spherical aberration due to the thickness of a specimen.

In the laser scanning microscope of the present invention, both high resolution images and bright fluorescence are ensured. The effect is more remarkably displayed in the observation of the deep parts of a specimen surface in which fluorescence greatly scatters. Generally, an immersion microscope objective is designed in such a way that aberration performance is improved on a living surface. However, the deeper is a living body to be observed, the larger becomes its spherical aberration to occur due to a difference in a refractive index between immersion liquid and the living body, failing to display high-resolution performance. Even if the spherical aberration difference is sufficiently corrected in terms of depth, a spherical aberration occurs when the observation depth is changed, resulting in deteriorated resolution performance. Therefore, it is preferable to provide the immersion microscope objective with a means for correcting spherical aberration due to the thickness of a specimen. For the spherical aberration correcting means, a correction collar immersion microscope objective for moving a specific group in the immersion microscope objective can also be used. Alternatively, a wave surface operating means, such as a deformable mirror in the laser scanning microscope and the like, can be used.

Furthermore, in the laser scanning microscope system, it is preferable for the fluorescence detection range on the specimen surface of the non-confocal detection optical unit to larger than the laser scanning range.

When a light scattering specimen, such as a living specimen, is observed, the influence of scattering is very great.

Figure 28:
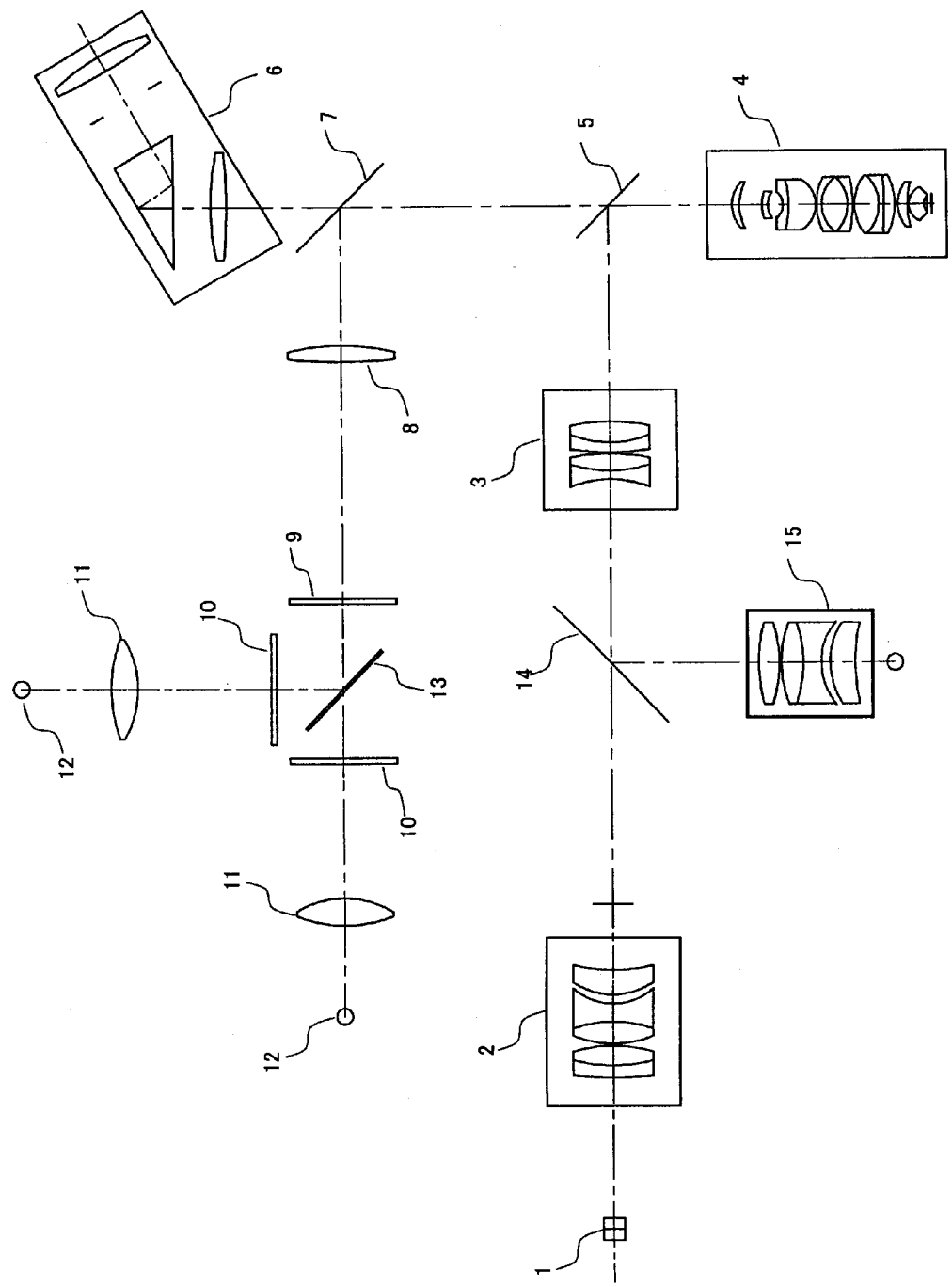
FIG. 28 is a schematic illustration of a laser scanning microscope system that uses the immersion microscope objective according to the present invention.
Figure 29:
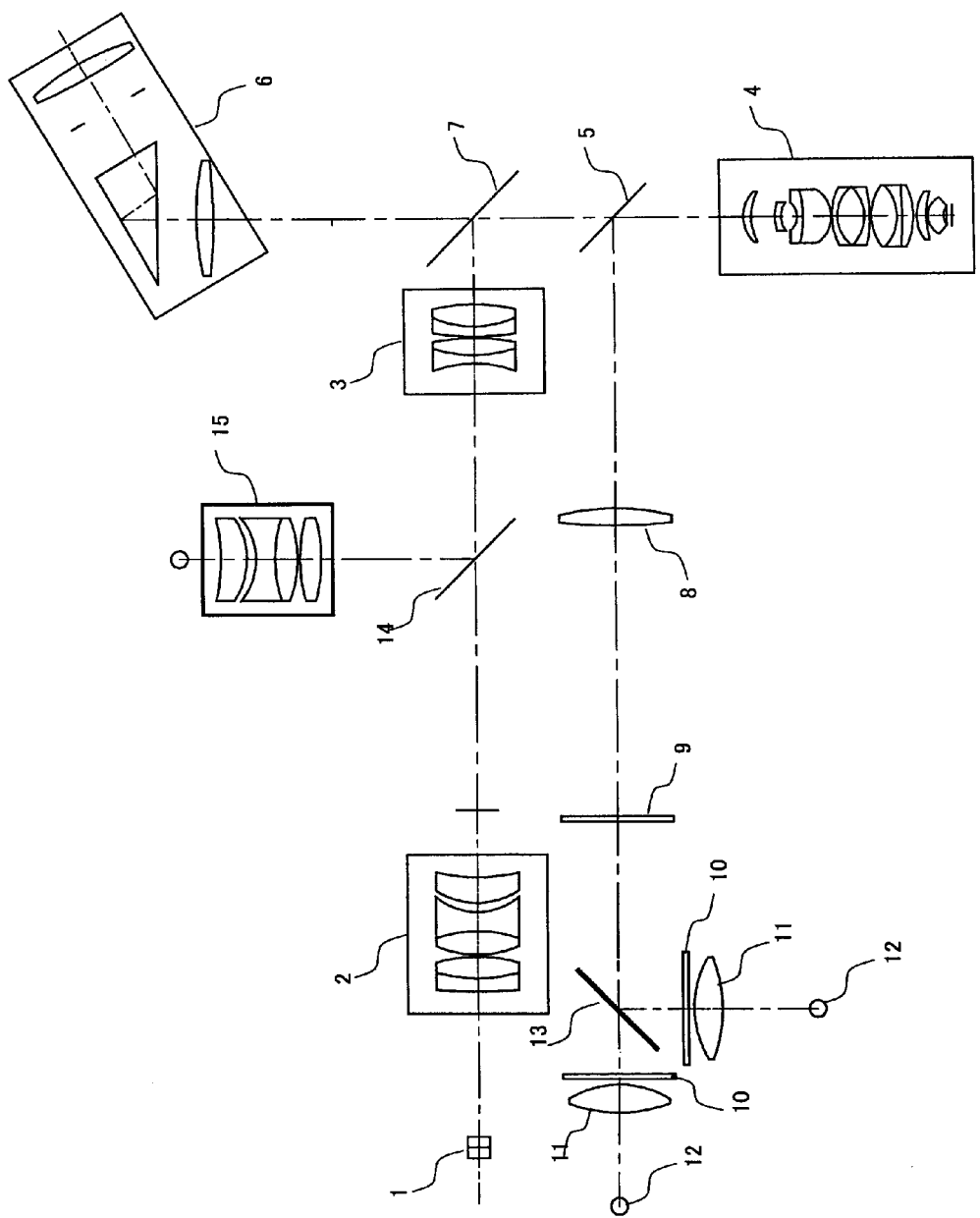
FIG. 29 is a schematic illustration of another laser scanning microscope system that uses the immersion microscope objective according to the present invention; and, FIG. 30 is an illustration of a non-confocal detection optical system that may be used in conjunction with the present invention.
Figure 31B:
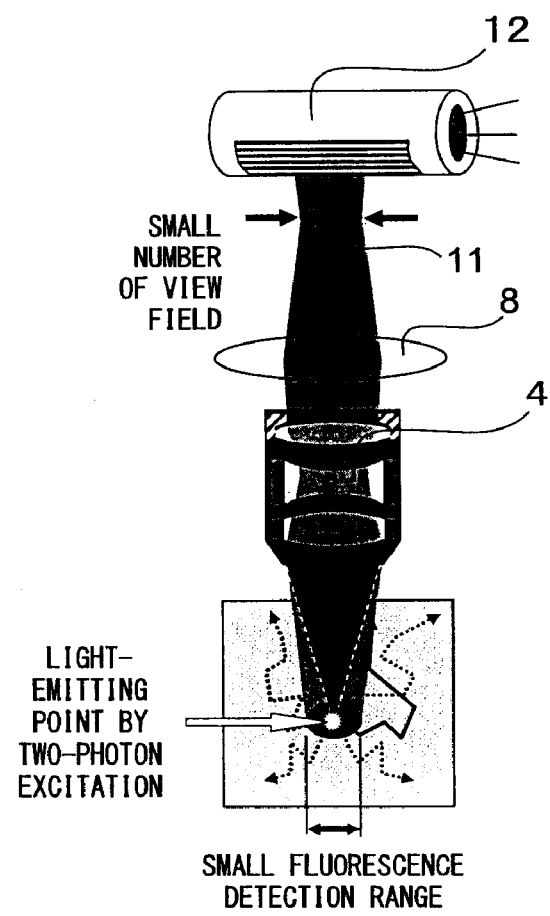
FIG. 31B is a schematic illustration of the detection efficiency of a detection optical system having a small field of view in a laser scanning microscope system that uses the present invention.

FIGS. 31A and 31B shows a typical detection optical system in the case where light scattering specimens, such as the brain, the internal organs and the like, is fluorescence-observed by multi-photon excitation using a laser scanning microscope using the immersion microscope objective of the present invention shown in FIG. 28 or 29.

FIGS. 31A and 31B typically show the difference of the taken amount of fluorescence in the case where an immersion microscope objective having the different detection field of view in the laser scanning microscope (the numerical apertures are the same).

In a multi-photon excitation microscope, generally the deep parts of a living specimen can be excited by a long wavelength laser, such as an infrared laser that is not relatively subjects to the influence of scattering however, since generated fluorescence has fairly short wavelengths, it is subjects to the influence of scattering and behaves like a pseudo light-emitting source having a three-dimensional distribution using an excited condensing point as the center. Therefore, fluorescence also occurs out of the scanning range of excited laser.

In other words, in order to take in more scattered fluorescence in the deep part of a living body, the larger is the fluorescence detection range of the immersion microscope objective, the brighter fluorescent images become. Specifically, since compared with FIG. 31A, FIG. 31B has a larger number of the fields of view, the fluorescence detection range extends and the detected amount of fluorescence increases. When there is sufficiently large scattering, there becomes no difference of detection efficiency in the detection position and it is considered that the detected amount of fluorescence is proportional to the square of the detected fields of view.

Although the above example is discussed using a multi-photon excitation microscope, there is no change in the fact that scattering also influences when a scattering specimen, such as a living body and the like is observed in a usual one-photon excitation observation. Therefore, it can be used for a laser scattering microscope system provided with a non-confocal point detection unit.

A condition that indicates a desirable relationship between the illumination system for a provided immersion microscope objective and the non-confocal detection optical system in a laser scanning microscope system is as follows:

'Yem/'Yex>1.2   Condition (24)

where

'Yex is the exit angle of the most off-axis principal ray of the immersion microscope objective defined by the illumination optical system of the laser scanning microscope system and 'Yem is the most off-axis principal ray of the immersion microscope objective defined by the non-confocal detection optical system of the laser scanning microscope system.

This condition means to extend the range of the field of view of the most off-axis principal ray of the immersion microscope objective defined by the illumination optical system of the laser scanning microscope system detection system more than that of the illumination optical system adopting a non-confocal point detection having a limitless deflection angle in the present invention. As a result, bright fluorescent images can be obtained.

In the laser scanning microscope system, it is also preferable for the optical system on the entrance side of the non-confocal detection optical system to meet the following condition:

$NAe > 0.06$   Condition (25)

where

NAe is the numerical aperture on the entrance side of the non-confocal detection optical system in ray tracing from the pupil.

Condition (25) ensures that bright fluorescent images are obtained. The observation range on the specimen surface is defined by NAe×f (where f is the focal length of the immersion microscope objective) and can be large when Condition (25) is satisfied. Fluorescence is significantly scattered by a specimen during two-photon excitation observation. The observation range on the specimen should be large for obtaining bright fluorescent images and it is desirable to satisfy Condition (25). A confocal detection optical system will not allow for a large observation range on the specimen surface, due to the limitation set by the deflection angle of the laser beam deflection means. On the other hand, during non-confocal detection, there is no such limitation and a large observation range on the specimen surface may be readily achieved during non-confocal detection.

It is also preferable that NAe satisfies the following condition:

$0.065 < NAe < 0.09$   Condition (25').

Condition (25') yields a structure that provides bright fluorescence more easily than Condition (25). Satisfaction of the lower limit of Condition (25') namely, 0.065<NAe, is necessary for bright fluorescence. On the other hand, when the upper limit of Condition (25'), namely, NAe<0.09, is satisfied, there is an an advantage in that the non-confocal detection system does not become excessively large. The same effect as in Condition (25') is obtained by satisfying the following Condition (26):

$1.8 > \text{'Yem/'Yex} > 1.3$   Condition (26)

The numerical number NA of the immersion microscope objective used in the laser scanning microscope system of the present invention desirably satisfies the following condition:

$0.85 < NA < 1.15$   Condition (27)

The laser scanning microscope of the present invention desirably enables both high resolution images to be observed and the measuring technique known as patch clamping. Therefore, the numerical aperture NA of the immersion microscope objective desirably satisfies Condition (27) above. If the numerical aperture does not exceed the lower limit value (0.85), fine spikes of the nerve cells cannot be imaged. On the other hand, if the numerical aperture is not lower than the upper limit (1.15), the access angle to the specimen becomes 30 degrees or smaller, making patch clamping difficult.

In the laser scanning microscope according to the present invention, it is preferable that the scanning optical system (from the laser beam deflection means to the immersion microscope objective) and the non-confocal detection optical system are independently provided, and that a means for splitting the optical path between the scanning optical system and the non-confocal detection optical system be provided on the image side of the objective lens.

Such a design resolves problems that arise due to the numerical aperture of the non-confocal detection optical system being larger than the laser scanning range. Thus, a high percentage of fluorescence scattered by the specimen may be detected. Therefore, the non-confocal detection optical system must be provided with lens components having an effective input aperture diameter that are larger than usual. When the non-confocal detection optical system and the scanning optical system are not independent (e.g., if the non-confocal detection optical system is provided in the optical path of the scanning optical system), some additional lens components (such as those of the imaging lens) will also need to have a larger-input aperture diameter. On the other hand, when the scanning optical system and non-confocal detection optical system are independently provided, it is not necessary to modify the scanning optical system.

The above laser scanning microscope can further include a non-scanning illumination introducing optical system. Furthermore, the non-scanning illumination introducing optical system can be provided independently of the non-confocal detection optical system.

Recently, an observation technique termed 'photo activation' has begun to be frequently used. In photo activation, samples are stimulated with light and their reaction is observed. A light stimulus is given by confocally scanning a focused laser spot, and a large area is stimulated at one time using non-confocal illumination methods. In order to observe the reaction of the sample at nearly the same time (i.e., immediately after) the stimulation, it is desirable that the sample stimulating optical system and the non-confocal detection optical system be provided independently.

Furthermore, it is desirable that the non-confocal detection optical system has a structure that includes a first pupil projection lens group for converting light from the pupil of the immersion microscope objective to a nearly collimated light beam and a second pupil projection lens group for collecting the nearly collimated light beam onto a photoelectric amplifier wherein the first and second pupil projection lens groups include a laser cut-off filter and a dichroic mirror.

It is more difficult in the laser scanning microscope of the present invention (as compared to prior art non-confocal detection systems) to introduce fluorescence into the photo-electrical amplifier because the numerical aperture of the emitted fluorescence is larger than the laser scanning range. Therefore, it is desirable that the non-confocal detection optical system be divided into first and second pupil projection lens groups, and that the beam be prevented from diverging. It is not desirable to use a diverging beam because this requires that subsequent filters and lens elements disadvantageously have large diameters. A laser cut-off filter and a dichroic mirror are provided between the first and second pupil projection lens groups to separate the fluorescence into two wavelengths. The laser cut-off filter and dichroic mirror must have specified incident angle properties. For example, the beam between the first and second pupil projection lens groups should be a converging light beam having an angle of convergence of approximately 5 degrees.

The present invention provides an immersion microscope objective optimized for use in a multiphoton excitation laser scanning microscope and a multiphoton excitation laser scanning microscope that uses such a lens. In other words, the present invention provides an immersion microscope objective having a large working distance, large access angles, and various aberrations are favorably corrected for infrared light while ensuring a wide field of view (i.e., a low magnification) and a large numerical aperture, as well as a multiphoton excitation laser scanning microscope that uses such a lens.

Six embodiments of an immersion microscope objective according to the present invention will now be described in detail. In each, light emerges from the immersion microscope objective as a collimated light flux. Thus, these immersion microscope objectives must be used in conjunction with an imaging lens for an image of a specimen to be formed. As one example, an imaging lens as shown in cross-section in FIG. 25 may be used. In each embodiment, the immersion liquid is water. The water has a refractive index of 1.33422 at the d-line and an Abbe number (relative to the d-line) of 55.89. The immersion microscope objective of the present invention can be used for observation of deep parts of a specimen. In such a case, it is assumed that the a specimen has a refractive index of 1.36 at the d-line and an Abbe number (relative to the d-line) of 58. These values are used in contemplation of the specimen of interest being animal brain.

Embodiment 1

In Embodiment 1, as shown in the cross-sectional view of FIG. 1, the first lens group G1 is formed by a doublet (consisting of a piano-convex lens element and a meniscus lens element with its concave surface on the object side) and a meniscus lens element. The second lens group G2 is formed by a triplet (consisting of two meniscus lens elements with their concave surfaces on the image side and a lens element of positive refractive power). The third lens group G3 is formed by a triplet (consisting of a meniscus lens element with its concave surface on the image side, a biconvex lens element, and a meniscus lens element with its concave surface on the object side. The fourth lens group G4 is formed of a doublet (consisting of two meniscus lens elements with their concave surfaces on the image side). The fifth lens group G5 is formed of two meniscus lens elements with their concave surfaces on the object side. In this embodiment, the second lens group G2 moves relative to the first and third lens groups G1 and G3 so as to correct aberrations.

The top line of Table 1 below lists the numerical aperture NA, the working distance WD in mm (for the index of refraction of the medium being 1.36 and the thickness of the specimen being 0.3 mm), the focal length f in mm, and the magnification β. In the columns of Table 1 are listed the surface number #, in order from the object side, the radius of curvature r in mm of the optical surface, the on-axis surface spacing d in mm between surfaces, the refractive index nd (at the d-line), and the Abbe number (relative to the d-line) of the immersion microscope objective of Embodiment 1.

TABLE 1

NA = 1.05; WD = 1.7293; medium thickness = 0.3 mm; medium nd = 1.36; f = 7.1838; β = 25

| # | r | d | nd | νd |
|---|---|---|---|---|
| 1 | INF | 1.15 | 1.45852 | 67.83 |
| 2 | −5.9903 | 5.7088 | 1.7725 | 49.6 |
| 3 | −6.8605 | 0.477 | | |
| 4 | −36.5263 | 3.6 | 1.56907 | 71.3 |
| 5 | −13.6341 | 1.1825 | | |
| 6 | 24.2042 | 4 | 1.497 | 81.14 |
| 7 | 126.6562 | 1.9 | 1.673 | 38.15 |
| 8 | 15.1716 | 9 | 1.43875 | 94.93 |
| 9 | −17.894 | 0.5919 | | |
| 10 | 43.9925 | 1.9 | 1.673 | 38.15 |
| 11 | 13.7154 | 9.6635 | 1.43875 | 94.97 |
| 12 | −12.6287 | 1.9 | 1.741 | 52.64 |
| 13 | −21.88 | 0.27 | | |
| 14 | 10.9415 | 10.0246 | 1.497 | 81.14 |
| 15 | 35.2043 | 2.1621 | 1.741 | 52.64 |
| 16 | 6.0773 | 5.7728 | | |
| 17 | −8.0008 | 2.2 | 1.6134 | 44.27 |
| 18 | −15.3052 | 8.2967 | | |
| 19 | −18.6412 | 2.8 | 1.673 | 38.15 |
| 20 | −12.2826 | 6.3468 | | |

Table 2 below lists the condition number, the variable of interest listed in the condition, and the value of that variable in Embodiment 1.

TABLE 2

(1)  $h1/h0 = 0.861383$
(2)  $h2/h1 = 0.517652$
(3)  $h3/h1 = 0.863643$
(4)  $f4/f5 = -0.02914$
(4') $Ro4/h1 = 1.245826$
(5)  $|f/f3| = 0.066865$
(6)  $|f2/f3| = 0.320606$
(8)  $f/f2 = 0.208557$
(9)  $Do/f = 11.2957$
(10) $NA \times f = 7.54299$
(11), (12) $|(\tan \omega 1)(\tan \omega 1 + 2/h4) - (\tan \omega 2)(\tan \omega 2 + 2/h5)| = 0.00179$
(13) $do + di = 1.77435$
(14) $|\beta s| = 5.52344$
(15) $(n2 - n1)/ra = 0.052423$
(16) $dt1/f = 0.280208$
(17) $dt2 = 0.477$
(18) $nd5p = 1.673$
(19) $vd5p = 38.15$
(20) $vpa - vna = 27.2075$
(21) $n1 - nw = 0.129$
(22) $rb/dt3 = 2.08$
(23) $fs/f = 1.76$
(24) $dt5 - dt4 = 4.56$ In the above structure, the second lens group (having surfaces with radii of curvature r6 to r9) is moved to correct aberrations resulting from the presence/absence of a cover glass, the observation depth in the specimen, and the observation wavelength.

The on-axis position of the second lens group (i.e., the lens group that is moved in this embodiment) according to the depth in the specimen is given in Table 3 below. The position of the second lens group is indicated (to less precision) by the on-axis surface spacings d5 and d9 in the lens data of Table 1 above, which corresponds (for a medium thickness of 0.3 mm) to the values do and di in Table 3 below.

TABLE 3

|  | medium thickness | | |
| --- | --- | --- | --- |
|  | 0.0 mm | 0.3 mm | 1.2 mm |
| WD | 2.01296 | 1.7293 | 0.87927 |
| distance before the movable group, do | 1.33569 | 1.18246 | 0.70529 |
| distance after the movable group, di | 0.43866 | 0.59192 | 1.06906 |
| do + di | 1.77435 | 1.77438 | 1.77435 |

The refractive index nd of the medium (at the d-line) was 1.36.

Figure 25:
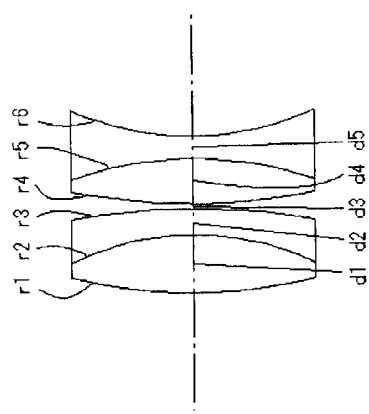
FIG. 25 is a cross-sectional view of an imaging lens that may be used in combination with the immersion microscope objective of Embodiments 1-6.

Embodiment 1 is an immersion microscope objective for infinite optical systems, from which light emerges as a parallel light flux, and is used in combination with an imaging lens that is shown in cross-section in FIG. 25.

Figure 7:
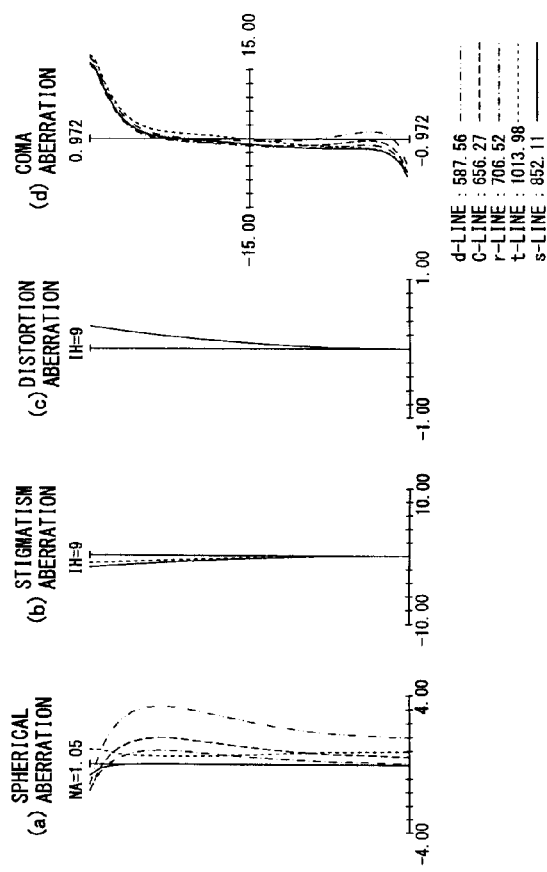
FIGS. 7A-7D show the spherical aberration, astigmatism, distortion, and coma, respectively, of the immersion microscope objective shown in FIG. 1 when the specimen thickness is 0.0 mm.
Figure 8:
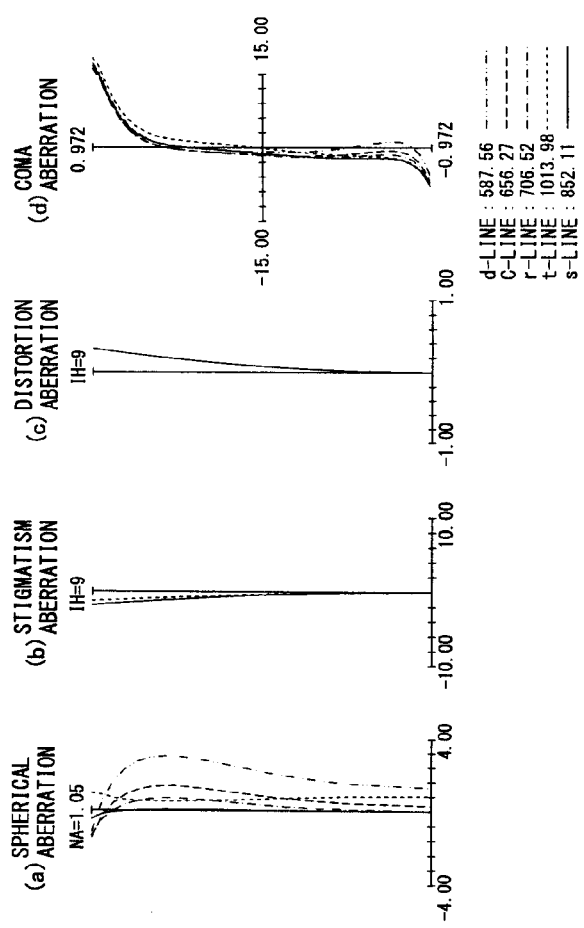
FIGS. 8A-8D show the spherical aberration, astigmatism, distortion, and coma, respectively, of the immersion microscope objective shown in FIG. 1 when the specimen thickness is 0.3 mm.
Figure 9:
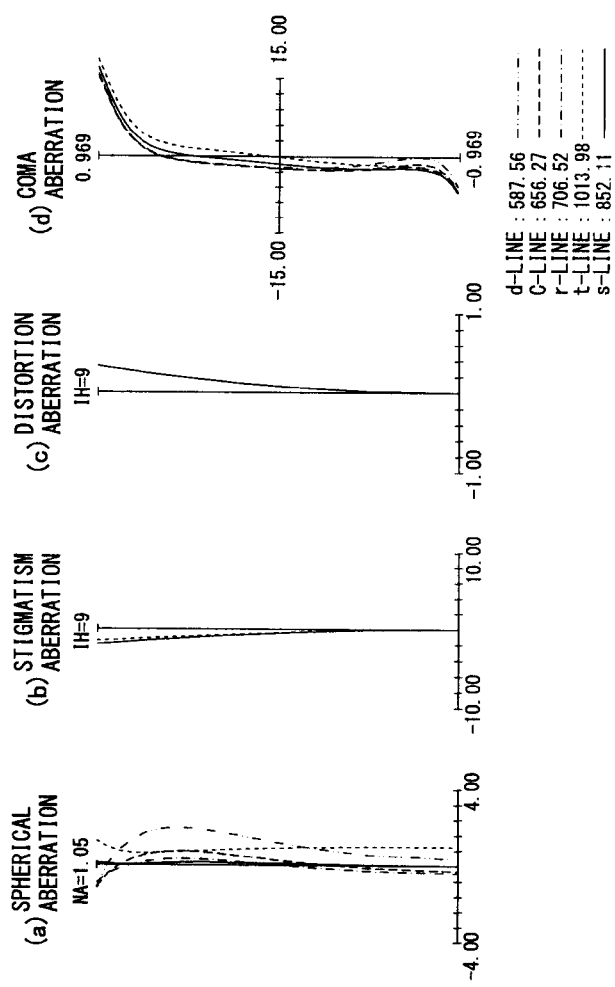
FIGS. 9A-9D show the spherical aberration, astigmatism, distortion, and coma, respectively, of the immersion microscope objective shown in FIG. 1 when the specimen thickness is 1.2 mm.

FIGS. 7A-7D, 8A-8D, and 9A-9D show various aberrations of the immersion microscope objective according to Embodiment 1 when the depth in the specimen is 0.0 mm, 0.3 mm, or 1.2 mm, respectively. FIGS. 7A, 8A and 9A show the spherical aberration, in mm (abscissa), versus the numerical aperture (ordinate), FIGS. 7B, 8B and 9B show the astigmatism, in mm (abscissa) versus the image height IH, in mm (ordinate), FIGS. 7C, 8C and 9C show the distortion, in mm (abscissa), versus the image height in mm (ordinate), and FIGS. 7D, 8D and 9D show the coma, in mm (abscissa), versus the normalized image height (ordinate). The astigmatism is shown in FIGS. 7B, 8B and 9B for both the sagittal S (solid line) and the tangential T (dotted line) image surfaces.

The spherical aberration and coma are shown for various spectral lines having the wavelengths (in nm) as indicated in FIGS. 7A, 8A and 9A, and in FIGS. 7D, 8D and 9D, respectively. The specimen had a refractive index of 1.36 at the d-line and an Abbe number (relative to the d-line) of 58. The water filling the specimen and the leading end of the immersion microscope objective had a refractive index of 1.33422 at the d-line and an Abbe number (relative to the d-line) of 55.89. The second lens group is movable and was positioned as shown in Table 3 above.

Embodiment 2

Figure 2:
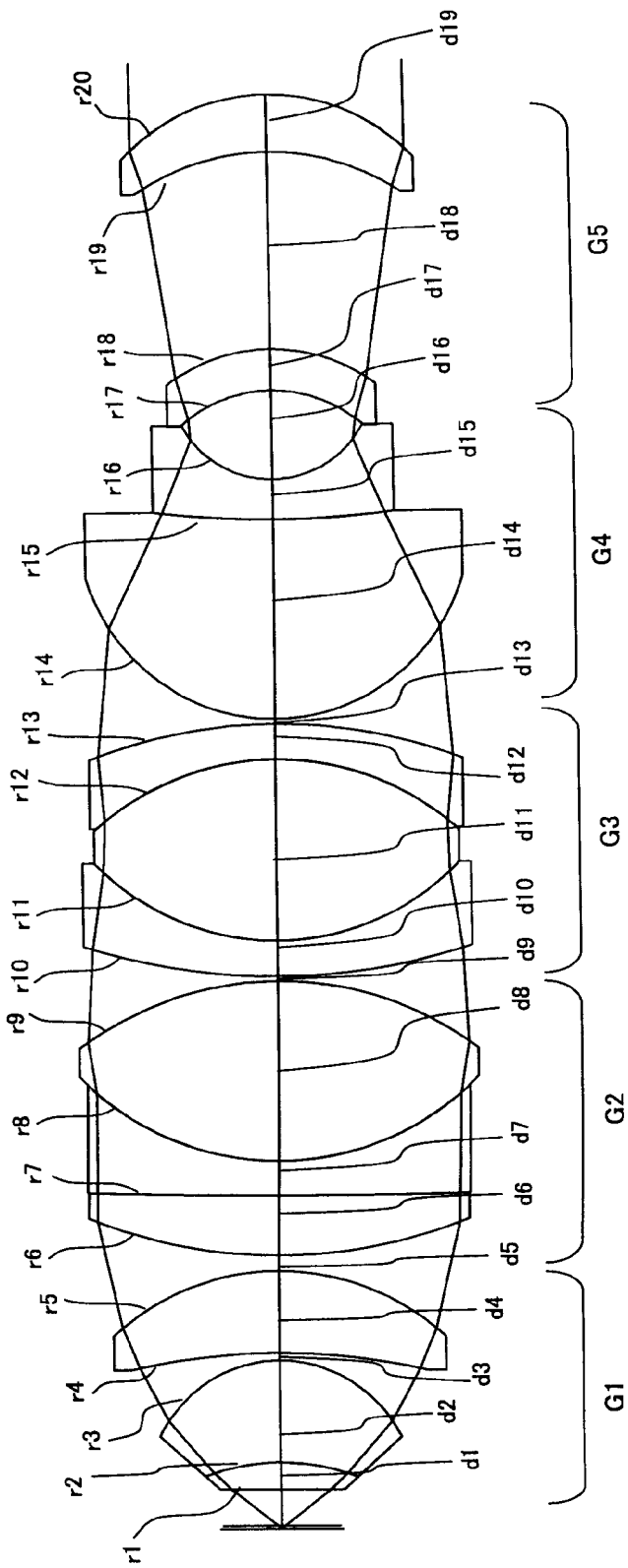
FIG. 2 is a cross-sectional view of the lens element and lens group configuration of an immersion microscope objective according to Embodiment 2 of the present invention.

In Embodiment 2, as shown in a cross-sectional view of FIG. 2, the first lens group G1 is formed of a doublet (that consists of a plano-convex lens and a meniscus lens with its concave surface on the object side) and a meniscus lens element. The second lens group G2 consists of a triplet that is formed of two meniscus lens elements with their concave surfaces on the image side, and a biconvex lens. The third lens group G3 consists of a triplet that is formed of a meniscus lens element with its concave surface on the image side, a biconvex lens, and a meniscus lens element with its concave surface on the object side. The fourth lens group G4 consists of a doublet that is formed of two meniscus lens elements with their concave surfaces on the image side. The fifth lens group G5 includes two meniscus lens elements, each with its concave surface on the object side. The second lens group G2 moves relative to the positions of the first and third lens groups G1 and G3 so as to correct aberrations.

The top line of Table 4 below lists the numerical aperture NA, the working distance WD in mm (for the index of refraction of the medium being 1.36 and the thickness of the specimen being 0.3 mm), the focal length f in mm, and the magnification β. In the columns of Table 4 are listed the surface number #, in order from the object side, the radius of curvature r in mm of the optical surface, the on-axis surface spacing d in mm between surfaces, the refractive index nd (at the d-line), and the Abbe number (relative to the d-line) of the immersion microscope objective of Embodiment 2.

TABLE 4

NA = 1.05; WD = 1.716; medium thickness = 0.3 mm; medium nd = 1.36; f = 7.16926; β = 25

| # | r | d | nd | vd |
| --- | --- | --- | --- | --- |
| 1 | INF | 1.5 | 1.45847 | 67.72 |
| 2 | −11.7569 | 5.4888 | 1.7725 | 49.6 |
| 3 | −7.4259 | 0.3662 | | |
| 4 | −36.4575 | 4.4573 | 1.56907 | 71.3 |
| 5 | −13.4012 | 0.8091 | | |
| 6 | 27.4292 | 3.2954 | 1.497 | 81.14 |
| 7 | 382.5801 | 1.9 | 1.673 | 38.15 |
| 8 | 15.1216 | 9.804 | 1.43875 | 94.93 |
| 9 | −18.4144 | 0.47 | | |
| 10 | 35.016 | 1.9 | 1.673 | 38.15 |
| 11 | 13.9356 | 9.7419 | 1.43875 | 94.97 |
| 12 | −15.0043 | 1.9 | 1.741 | 52.64 |
| 13 | −28.5245 | 0.27 | | |
| 14 | 10.7404 | 10.7922 | 1.497 | 81.14 |
| 15 | 50 | 2.2 | 1.7725 | 49.6 |
| 16 | 5.6752 | 4.7658 | | |
| 17 | −7.713 | 2.2 | 1.48749 | 70.23 |
| 18 | −9.7277 | 10.8562 | | |
| 19 | −13.0019 | 3 | 1.673 | 38.15 |
| 20 | −11.2539 | −2.7573 | | |

Table 5 below lists the condition number, the variable of interest listed in the condition, and the value of that variable in Embodiment 2.

TABLE 5

(1) h1/h0 = 0.86881013
(2) h2/h1 = 0.48948784
(3) h3/h1 = 0.83891124
(4) f4/f5 = −0.2659539
(4') Ro4/h1 = 1.19725974
(5) |f/f3| = 0.06339608
(6) |f2/f3| = 0.34358661
(8) f/f2 = 0.18451266
(9) Do/f = 10.4816108
(10) NA × f = 7.527723
(11), (12) |(tan ω1)(tan ω1 + 2/h4) − (tan ω2)(tan ω2 + 2/h5)| = 0.000709
(13) do + di = 1.27907
(14) |βs| = 8.4403965
(15) (n2 − n1)/ra = 0.02671027
(16) dt1/f = 0.27943051
(18) nd5p = 1.673
(19) vd5p = 38.15
(20) vpa − vna = 22.6235
(21) n1 − nw = 0.129
(22) rb/dt3 = 3.66
(23) fs/f = 1.62
(24) dt5 − dt4 = 3.99

In the above structure, the second lens group (having surfaces with radii of curvature r6 to r9) is moved in order to correct aberrations resulting from the presence/absence of a cover glass, the observation depth in the specimen and the observation wavelength. Thus, the positioning of the second lens group along the optical axis varies according to the depth in the specimen and is given in Table 6 below. The on-axis position of the second lens group is indicated (to less precision) by the surface spacings d5 and d9 in the lens data of Table 4 above, which corresponds (for a medium thickness of 0.3 mm) to the distances do and di, respectively, in Table 6 below.

TABLE 6

| | medium thickness | | |
|---|---|---|---|
| | 0.0 mm | 0.3 mm | 1.2 mm |
| WD | 2.00331 | 1.71604 | 0.86 |
| distance before the movable group, do | 0.91886 | 0.80908 | 0.38398 |
| distance after the movable group, di | 0.36021 | 0.46998 | 0.89508 |
| do + di | 1.27907 | 1.27906 | 1.27906 |

The refractive index nd of the medium (at the d-line) was 1.36.

Embodiment 2 is an immersion microscope objective for infinite optical systems, from which light emerges as a parallel light flux, and is used in combination with an imaging lens shown in a cross-sectional view in FIG. 25.

Figure 10:
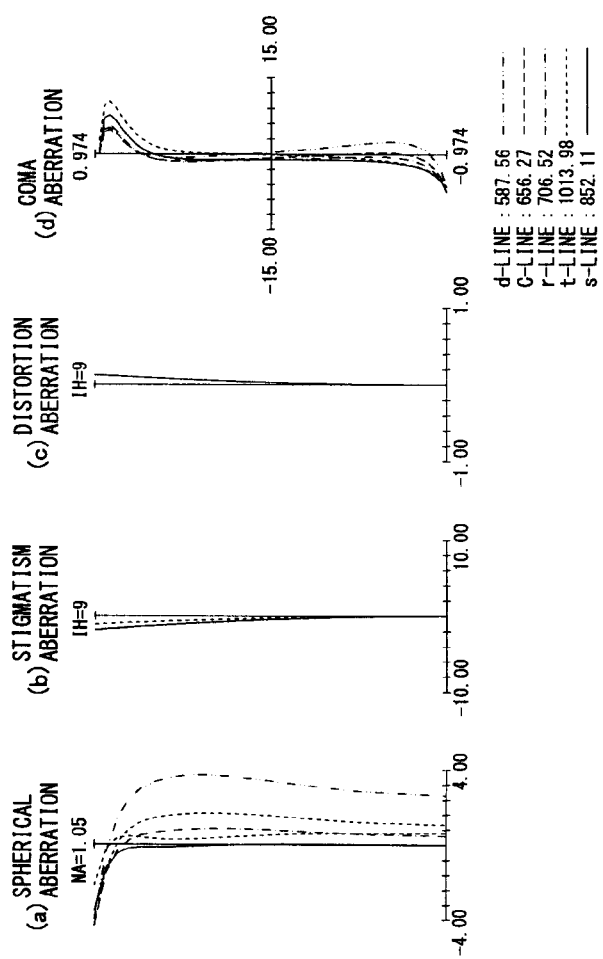
FIGS. 10A-10D show the spherical aberration, astigmatism, distortion, and coma, respectively, of the immersion microscope objective shown in FIG. 2 when the specimen thickness is 0.0 mm.
Figure 11:
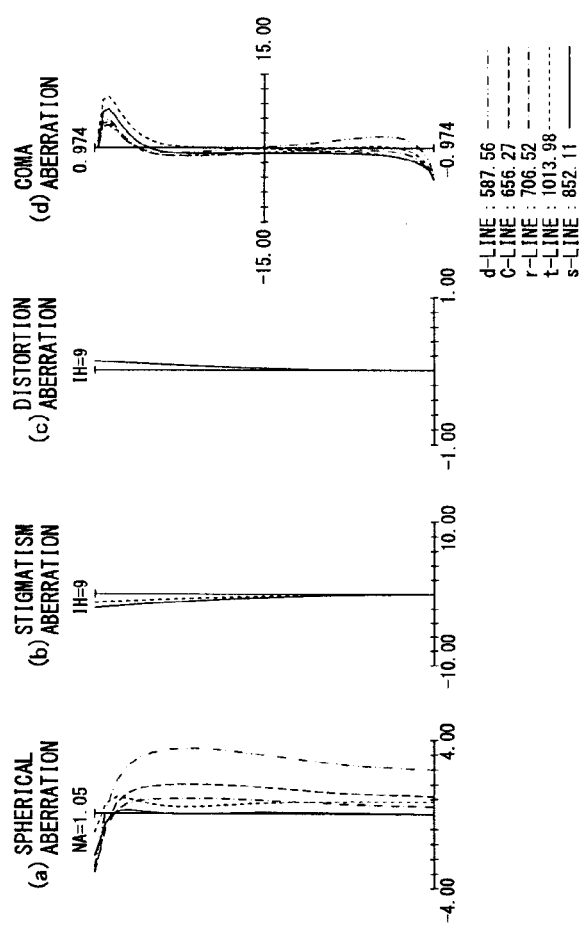
FIGS. 11A-11D show the spherical aberration, astigmatism, distortion, and coma, respectively, of the immersion microscope objective shown in FIG. 2 when the specimen thickness is 0.3 mm.
Figure 12:
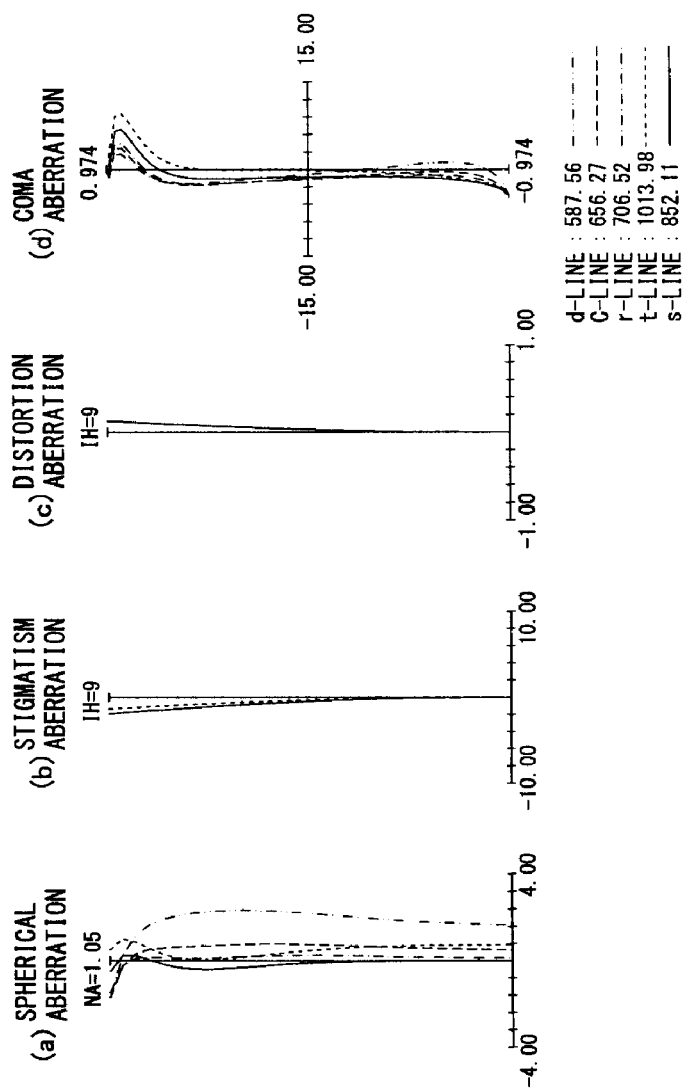
FIGS. 12A-12D show the spherical aberration, astigmatism, distortion, and coma, respectively, of the immersion microscope objective shown in FIG. 2 when the specimen thickness is 1.2 mm.

FIGS. 10A-10D, 11A-11D, and 12A-12D show various aberrations of the immersion microscope objective according to Embodiment 2 when the depth in the specimen is 0.0 mm, 0.3 mm, or 1.2 mm, respectively. FIGS. 10A, 11A and 12A show the spherical aberration in mm (abscissa) versus the numerical aperture (ordinate), FIGS. 10B, 11B and 12B show the astigmatism in mm (abscissa) versus the image height IH in mm (ordinate), FIGS. 10C, 11C and 12C show the distortion in mm (abscissa) versus the image height in mm (ordinate), and FIGS. 10D, 11D and 12D show the coma in mm (abscissa) versus the normalized image height (ordinate). The astigmatism is shown in FIGS. 10B, 11B and 12B for both the sagittal S (solid line) and the tangential T (dotted line) image surfaces. The spherical aberration and coma are shown for various spectral lines having the wavelengths (in nm) as indicated in FIGS. 10A, 11A and 12A, and in FIGS. 10D, 11D and 12D, respectively. The specimen had a refractive index of 1.36 at, the d-line and an Abbe number (relative to the d-line) of 58. The water filling the specimen and the leading end of the immersion microscope objective had a refractive index of 1.33422 at the d-line and an Abbe number (relative to the d-line) of 55.89. The second lens group is movable and was positioned as shown in Table 6 above.

Embodiment 3

Figure 3:
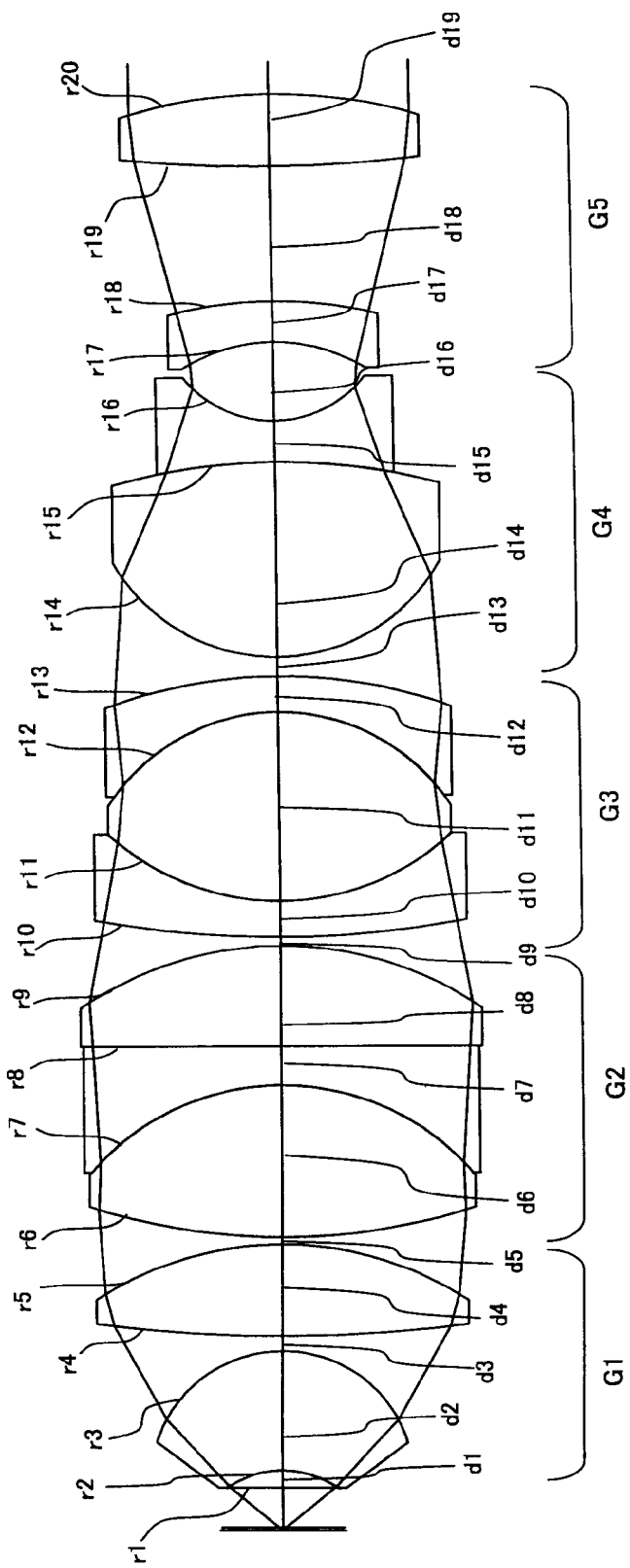
FIG. 3 is a cross-sectional view of the lens element and lens group configuration of an immersion microscope objective according to Embodiment 3 of the present invention.

In Embodiment 3, as shown in a cross-sectional view of FIG. 3, the first lens group G1 is formed of a doublet (that consists of a plano-convex lens element with its planar surface on the object side and a meniscus lens element with its concave surface on the object side) and a biconvex lens. The second lens group G2 is formed of a biconvex lens, a plano-concave lens with its concave surface on the object side, and a plano-convex lens. The third lens group G3 is formed by a triplet (that consists of a meniscus lens element with its concave surface on the image side, a biconvex lens element, and a meniscus lens element with its concave surface on the object side. The fourth lens group G4 is formed of a doublet that consists of a biconvex lens element and a biconcave lens element. The fifth lens group G5 is formed of a meniscus lens element with its concave surface on the object side and a biconvex lens element. The third lens group G3 moves along the optical axis relative to the second and fourth lens groups G2 and G4 so as to correct aberrations.

The top line of Table 7 below lists the numerical aperture NA, the working distance WD in mm (for the index of refraction of the medium being 1.36 and the thickness of the specimen being 0.3 mm), the focal length f in mm, and the magnification β. In the columns of Table 7 are listed the surface number #, in order from the object side, the radius of curvature r in mm of the optical surface, the on-axis surface spacing d in mm between surfaces, the refractive index nd (at the d-line), and the Abbe number vd (relative to the d-line) of each optical element of the immersion microscope objective according to Embodiment 3.

TABLE 7

NA = 1.05; WD = 1.7506; medium thickness = 0.3 mm; medium nd - 1.36; f = 7.194006; β = 25

| # | r | d | nd | vd |
|---|---|---|---|---|
| 1 | INF | 0.92 | 1.45852 | 67.83 |
| 2 | −5.2326 | 6.3714 | 1.7725 | 49.6 |
| 3 | −7.0187 | 0.8371 | | |
| 4 | 74.2279 | 5 | 1.56907 | 71.3 |
| 5 | −17.9499 | 0.3797 | | |
| 6 | 33.8822 | 7.9915 | 1.497 | 81.14 |
| 7 | −13.6493 | 2.1 | 1.673 | 38.15 |
| 8 | INF | 5.3738 | 1.43875 | 94.93 |
| 9 | −19.0013 | 0.6008 | | |
| 10 | 54.4017 | 1.9 | 1.6134 | 44.27 |
| 11 | 13.6682 | 9.8737 | 1.43875 | 94.97 |
| 12 | −11.0022 | 1.9 | 1.741 | 52.64 |
| 13 | −26.8938 | 0.9043 | | |
| 14 | 10.0655 | 10.2751 | 1.497 | 81.14 |
| 15 | −33.5963 | 2.1621 | 1.741 | 52.64 |
| 16 | 6.1579 | 4.1814 | | |
| 17 | −9.2881 | 2.2 | 1.6134 | 44.27 |

TABLE 7-continued

NA = 1.05; WD = 1.7506; medium thickness = 0.3 mm; medium nd - 1.36; f = 7.194006; β = 25

| # | r | d | nd | vd |
|---|---|---|---|---|
| 18 | −23.2465 | 7.1445 | | |
| 19 | 74.4613 | 3.8 | 1.673 | 38.15 |
| 20 | −26.9715 | −3.124 | | |

Table 8 below lists the condition number, the variable of interest listed in the condition, and the value of that variable in Embodiment 3.

TABLE 8

| | |
|---|---|
| (1) | h1/h0 = 0.804825 |
| (2) | h2/h1 = 0.524671 |
| (3) | h3/h1 = 0.924573 |
| (4) | f4/f5 = −0.3618 |
| (4') | Ro4/h1 = 1.235588 |
| (5) | \|f/f3\| = 0.0028 |
| (6) | \|f2/f3\| = 0.01639 |
| (7) | \|β3\| = 1.068896 |
| (8) | f/f2 = 0.170827 |
| (9) | Do/f = 10.14901 |
| (10) | NA × f = 7.553706 |
| (11), (12) | \|(tan ω1) (tan ω1 + 2/h4) − (tan ω2) (tan ω2 + 2/h5)\| = 0.003179 |
| (13) | do + di = 1.50515 |
| (14) | \|βs\| = 1.068896 |
| (15) | (n2 − n1)/ra = 0.060014 |
| (16) | dt1/f = 0.284326 |
| (17) | dt2 = 0.8371 |
| (18) | nd5p = 1.673 |
| (19) | vd5p = 38.15 |
| (20) | vpa − vna = 25.9835 |
| (21) | n1 − nw = 0.129 |
| (22) | rb/dt3 = 1.96 |
| (23) | fs/f = 1.88 |
| (24) | dt5 − dt4 = 5.45 |

In the above structure, the third lens group (having surfaces with radii of curvature r10 to r13) is moved in order to correct aberrations resulting from the presence/absence of a cover glass, the observation depth of the specimen, and the observation wavelength. Thus, the positioning of the third lens group along the optical axis varies according to the depth in the specimen and is given in Table 9 below. The on-axis position of the third lens group is indicated (to less precision) by the surface spacings d9 and d13 in the lens data of Table 7 above, which corresponds to the distances do and di, respectively, in Table 9 below.

TABLE 9

| | medium thickness | | |
|---|---|---|---|
| | 0.0 mm | 0.3 mm | 1.2 mm |
| WD | 2.04544 | 1.75063 | 0.86629 |
| distance before the movable group, do | 0.50057 | 0.60085 | 0.91058 |
| distance after the movable group, di | 1.00458 | 0.90431 | 0.59458 |
| do + di | 1.50515 | 1.50516 | 1.50516 |

The refractive index nd of the medium (at the d-line) was 1.36.

Embodiment 3 is an immersion microscope objective for infinite optical systems, from which light emerges as a parallel light flux, and is used in combination with an imaging lens that is shown in cross-section in FIG. 25.

Figure 13:
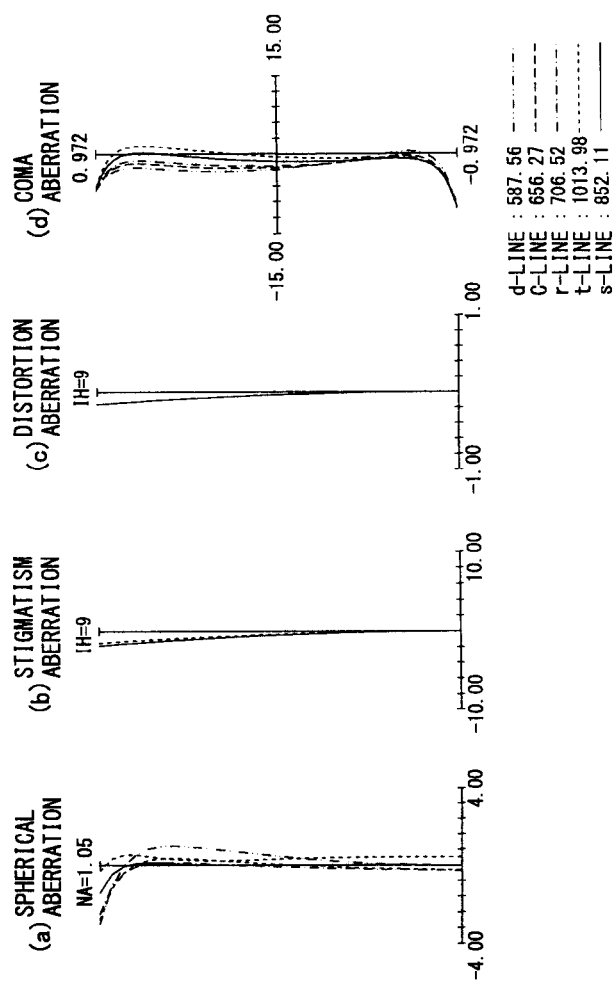
FIGS. 13A-13D show the spherical aberration, astigmatism, distortion, and coma, respectively, of the immersion microscope objective shown in FIG. 3 when the specimen thickness is 0.0 mm.
Figure 15:
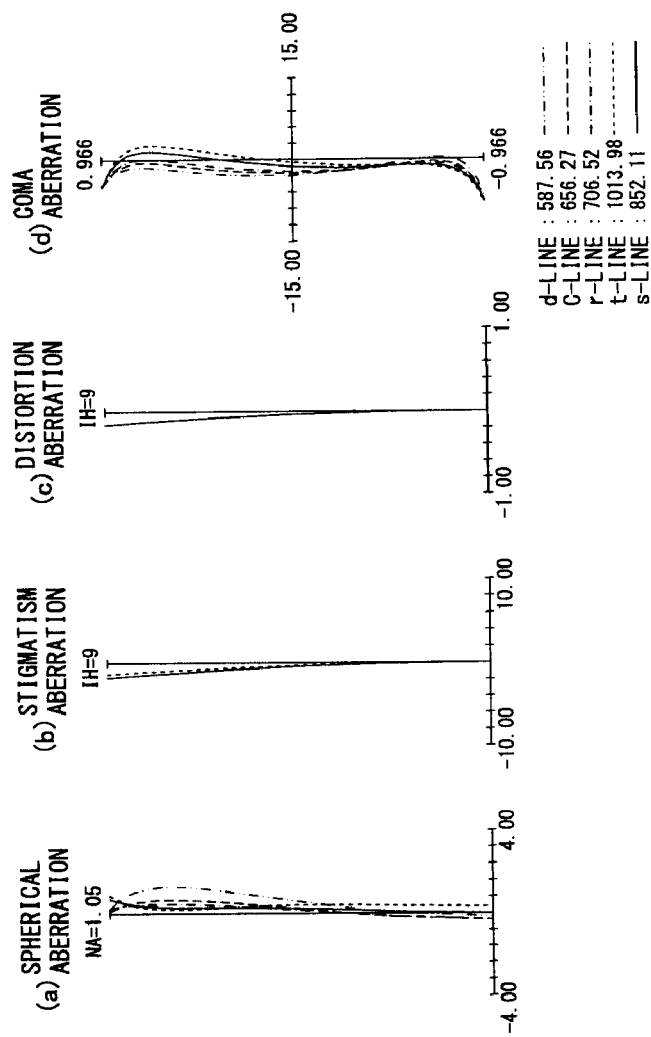
FIGS. 15A-15D show the spherical aberration, astigmatism, distortion, and coma, respectively, of the immersion microscope objective shown in FIG. 3 when the specimen thickness is 1.2 μm.

FIGS. 13A-13D, 14A-14D, and 15A-15D show various aberrations of the immersion microscope objective according to Embodiment 3 when the depth in the specimen is 0.0 mm, 0.3 mm, or 1.2 mm, respectively. FIGS. 13A, 14A and 15A show the spherical aberration, in mm (abscissa) versus the numerical aperture (ordinate), FIGS. 13B, 14B and 15B show the astigmatism in mm (abscissa) versus the image height IH in mm (ordinate), FIGS. 13C, 14C and 15C show the distortion in mm (abscissa) versus the image height in mm (ordinate), and FIGS. 13D, 14D and 15D show the coma in mm (abscissa) versus the normalized image height (ordinate). The astigmatism is shown in FIGS. 13B, 14B and 15B for both the sagittal S (solid line) and the tangential T (dotted line) image surfaces. The spherical aberration and coma are shown for various spectral lines having the wavelengths (in nm) as indicated in FIGS. 13A, 14A and 15A, and in FIGS. 13D, 14D and 15D, respectively. The specimen had a refractive index of 1.36 at the d-line and an Abbe number vd (relative to the d-line) of 58. The water filling the specimen and the leading end of the immersion microscope objective had a refractive index of 1.33422 at the d-line and an Abbe number vd (relative to the d-line) of 55.89. The third lens group is movable and was positioned as shown in Table 9 above.

Embodiment 4

Figure 4:
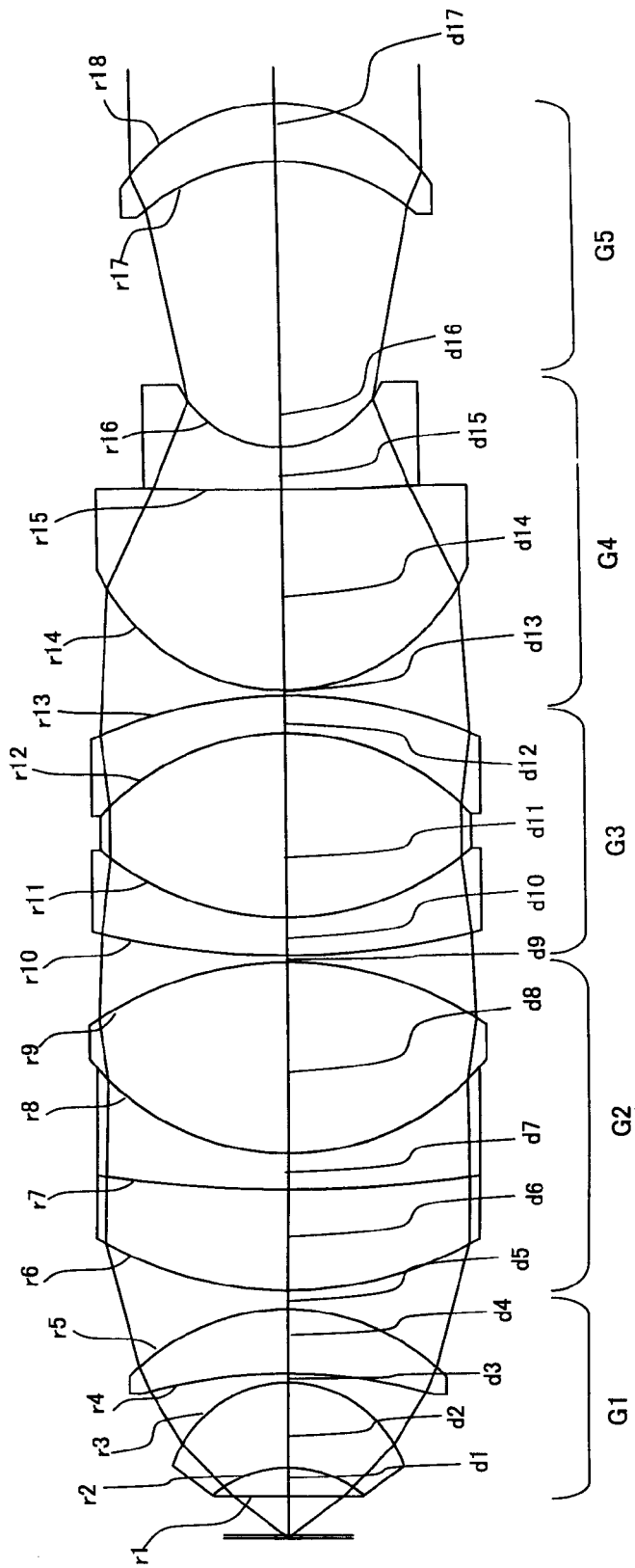
FIG. 4 is a cross-sectional view of the lens element and lens group configuration of an immersion microscope objective according to Embodiment 4 of the present invention.

In Embodiment 4, as shown in the cross-sectional view of FIG. 4, the first lens group G1 is formed of a doublet (consisting of a plano-convex lens element and a meniscus lens element with its concave surface on the object side) and a meniscus lens element. The second lens group G2 is formed of a triplet consisting of two meniscus lens elements with their concave surfaces on the image side and a biconvex lens element. The third lens group G3 is formed of a triplet consisting of a meniscus lens element with its concave surface on the image side, a biconvex lens element, and a meniscus lens element with its concave surface on the object side. The fourth lens group G4 is formed of a doublet consisting of two meniscus lens elements with their concave surfaces on the image side. The fifth lens group G5 is formed of a meniscus lens element with its concave surface on the object side. The second lens group G2 moves relative to the first lens group G1 and the third lens group G3 so as to correct aberrations.

The top line of Table 10 below lists the numerical aperture NA, the working distance WD in mm (assuming the index of refraction of the medium is 1.36 and the thickness of the specimen is 0.3 mm), the focal length f in mm, and the magnification β. In the columns of Table 10 are listed the surface number #, in order from the object side, the radius of curvature r in mm of the optical surface, the on-axis surface spacing d in mm between surfaces, the refractive index nd (at the d-line), and the Abbe number vd (relative to the d-line) of each optical element of the immersion microscope objective according to Embodiment 4.

TABLE 10

NA = 1.05; WD = 1.8048; medium thickness = 0.3 mm; medium nd = 1.36; f = 7.134036; β = 25

| # | r | d | nd | vd |
|---|---|---|---|---|
| 1 | INF | 1.5 | 1.45847 | 67.72 |
| 2 | −6.0537 | 4.4108 | 1.7725 | 49.6 |
| 3 | −6.3534 | 0.3535 | | |
| 4 | −28.0186 | 3.2799 | 1.56907 | 71.3 |

TABLE 10-continued

NA = 1.05; WD = 1.8048; medium thickness = 0.3 mm; medium
nd = 1.36; f = 7.134036; β = 25

| # | r | d | nd | νd |
|---|---|---|---|---|
| 5 | −11.5946 | 0.8915 | | |
| 6 | 19.6651 | 5.2839 | 1.43875 | 94.93 |
| 7 | 66.3182 | 1.9 | 1.673 | 38.15 |
| 8 | 13.2047 | 9.7803 | 1.43875 | 94.93 |
| 9 | −18.7485 | 0.5098 | | |
| 10 | 42.8888 | 1.9 | 1.741 | 52.64 |
| 11 | 14.9377 | 9.5309 | 1.43875 | 94.97 |
| 12 | −13.1562 | 1.9 | 1.673 | 38.15 |
| 13 | −24.7961 | 0.2701 | | |
| 14 | 10.6159 | 10.2209 | 1.497 | 81.14 |
| 15 | 160.6704 | 2.2 | 1.741 | 52.64 |
| 16 | 5.9115 | 14.8078 | | |
| 17 | −10.7329 | 3 | 1.673 | 38.15 |
| 18 | −9.7731 | 0.5553 | | |

Table 11 below lists the condition number, the variable of interest listed in the condition, and the value of that variable in Embodiment 4.

TABLE 11

| (1) | h1/h0 = 0.931453 |
|---|---|
| (2) | h2/h1 - 0.524893 |
| (3) | h3/h1 = 0.846295 |
| (4) | f4/f5 = −0.46566 |
| (4') | Ro4/h1 = 1.179629 |
| (5) | |f/f3| = 0.052587 |
| (6) | |f2/f3| = 0.253905 |
| (8) | f/f2 = 0.207112 |
| (9) | Do/f = 10.45963 |
| (10) | NA × f = 7.490738 |
| (11), (12) | |(tan ω1)(tan ω1 + 2/h4) − (tan ω2)(tan ω2 + 2/h5)| = 0.000248 |
| (13) | do + di = 1.40128 |
| (14) | |βs| = 0.25979 |
| (15) | (n2 − n1)/ra = 0.051874 |
| (16) | dt1/f = 0.25299 |
| (18) | nd5p = 1.673 |
| (19) | vd5p = 38.15 |
| (20) | νpa − νna = 28.93125 |
| (21) | n1 − nw = 0.129 |
| (22) | rb/dt3 = 1.02 |
| (23) | fs/f = 1.64 |
| (24) | dt5 − dt4 = 2.91 |

In the above structure, the second lens group (having surfaces with radii of curvature r6 to r9) is moved in order to correct aberrations resulting from the presence/absence of a cover glass, the observation depth in the specimen, and the observation wavelength. Thus, the positioning of the second lens group along the optical axis varies according to the depth of observation of the specimen and is given in Table 12 below. The on-axis position of the second lens group is indicated (to less precision) by the surface spacings d5 and d9 in the lens data of Table 10 above, which corresponds (for a medium thickness of 0.3 mm) to the distances do and di, respectively, in Table 12 below.

TABLE 12

| | medium thickness | | |
|---|---|---|---|
| | 0.0 mm | 0.3 mm | 1.2 mm |
| WD | 1.80484 | 2.08661 | 0.96613 |
| distance before the movable group, do | 0.89149 | 1.05172 | 0.31837 |
| distance after the movable group, di | 0.50979 | 0.34956 | 1.08292 |
| do + di | 1.40128 | 1.40128 | 1.40129 |

The refractive index nd of the medium (at the d-line) was 1.36.

Embodiment 4 is an immersion microscope objective for infinite optical systems, from which light emerges as a parallel light flux, and is used in combination with an imaging lens that is shown in cross-section in FIG. 25.

Figure 16:
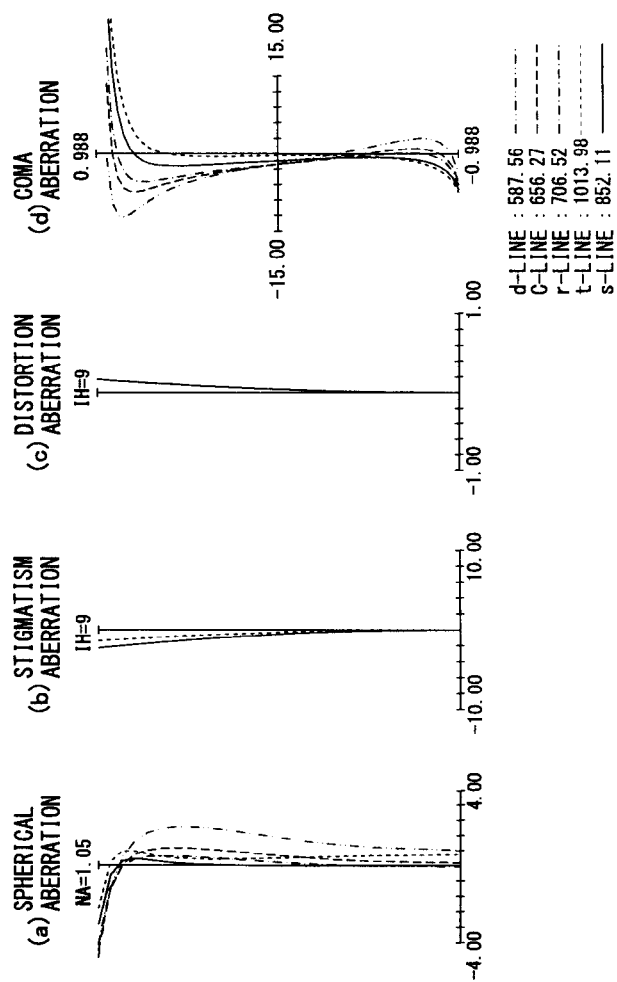
FIGS. 16A-16D show the spherical aberration, astigmatism, distortion, and coma, respectively, of the immersion microscope objective shown in FIG. 4 when the specimen thickness is 0.0 mm.
Figure 17:
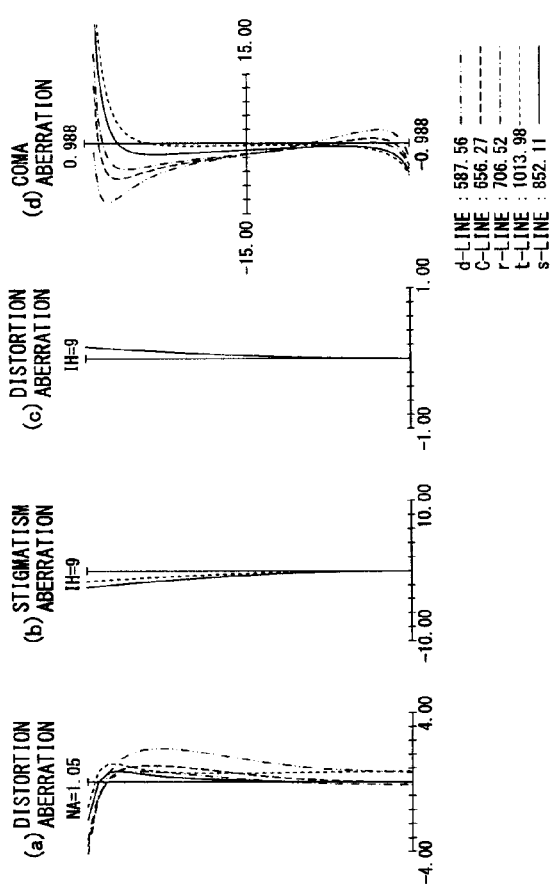
FIGS. 17A-17D show the spherical aberration, astigmatism, distortion, and coma respectively, of the immersion microscope objective shown in FIG. 4 when the specimen thickness is 0.3 mm.
Figure 18:
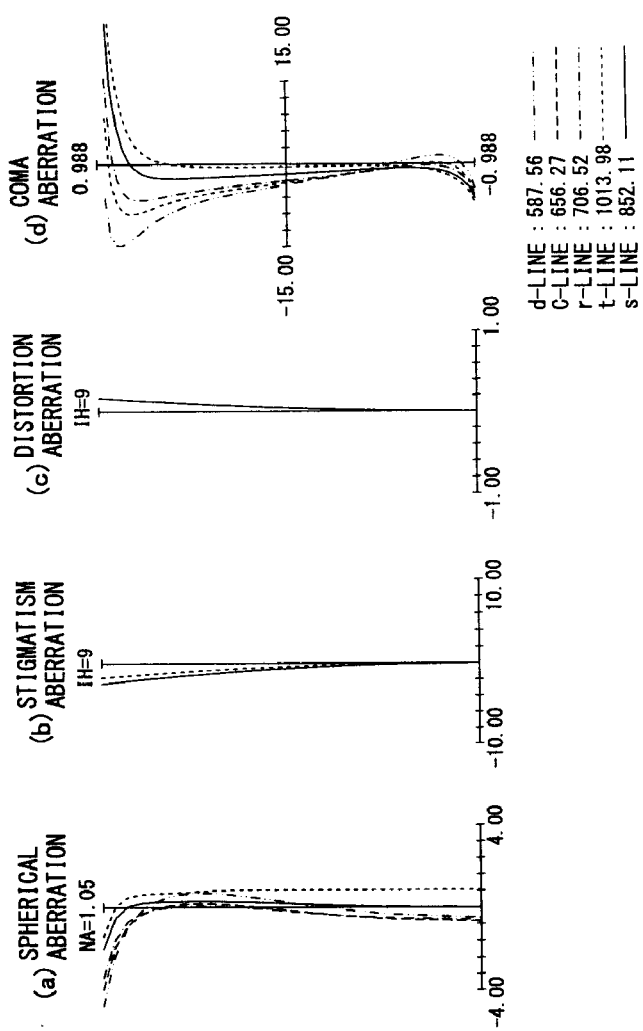
FIGS. 18A-18D show the spherical aberration, astigmatism, distortion, and coma, respectively, of the immersion microscope objective shown in FIG. 4 when the specimen thickness is 1.2 mm.

FIGS. 16A-16D, 17A-17D, and 18A-18D show various aberrations of the immersion microscope objective according to Embodiment 4 when the depth in the specimen is 0.0 mm, 0.3 mm, or 1.2 mm, respectively. FIGS. 16A, 17A and 18A show the spherical aberration, in mm (abscissa) versus the numerical aperture (ordinate), FIGS. 16B, 17B and 18B show the astigmatism in mm (abscissa) versus the image height IH in mm (ordinate), FIGS. 16C, 17C and 18C show the distortion in mm (abscissa) versus the image height in mm (ordinate), and FIGS. 16D, 17D and 18D show the coma in mm (abscissa) versus the normalized image height (ordinate). The astigmatism is shown in FIGS. 16B, 17B and 18B for both the sagittal S (solid line) and the tangential T (dotted line) image surfaces. The spherical aberration and coma are shown for various spectral lines having the wavelengths (in nm) as indicated in FIGS. 16A, 17A and 18A, and in FIGS. 16D, 17D and 18D, respectively. The specimen had a refractive index of 1.36 at the d-line and an Abbe number of 58 (relative to the d-line). The water filling the specimen and the leading end of the immersion microscope objective had a refractive index of 1.33422 at the d-line and an Abbe number of 55.89 (relative to the d-line). The second lens group is movable and was positioned as shown in the Table 12 above.

Embodiment 5

Figure 5:
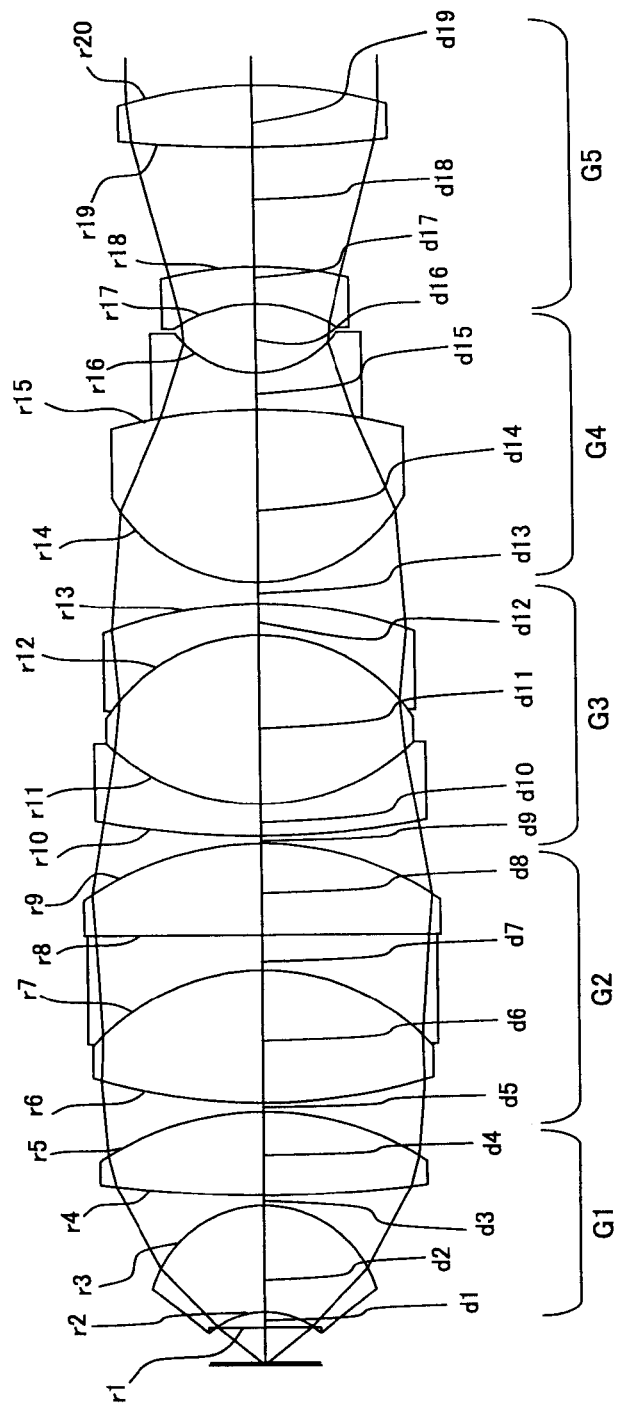
FIG. 5 is the cross-sectional view of the lens element and group configuration of an immersion microscope objective according to Embodiment 5 of the present invention.
Figure 6:
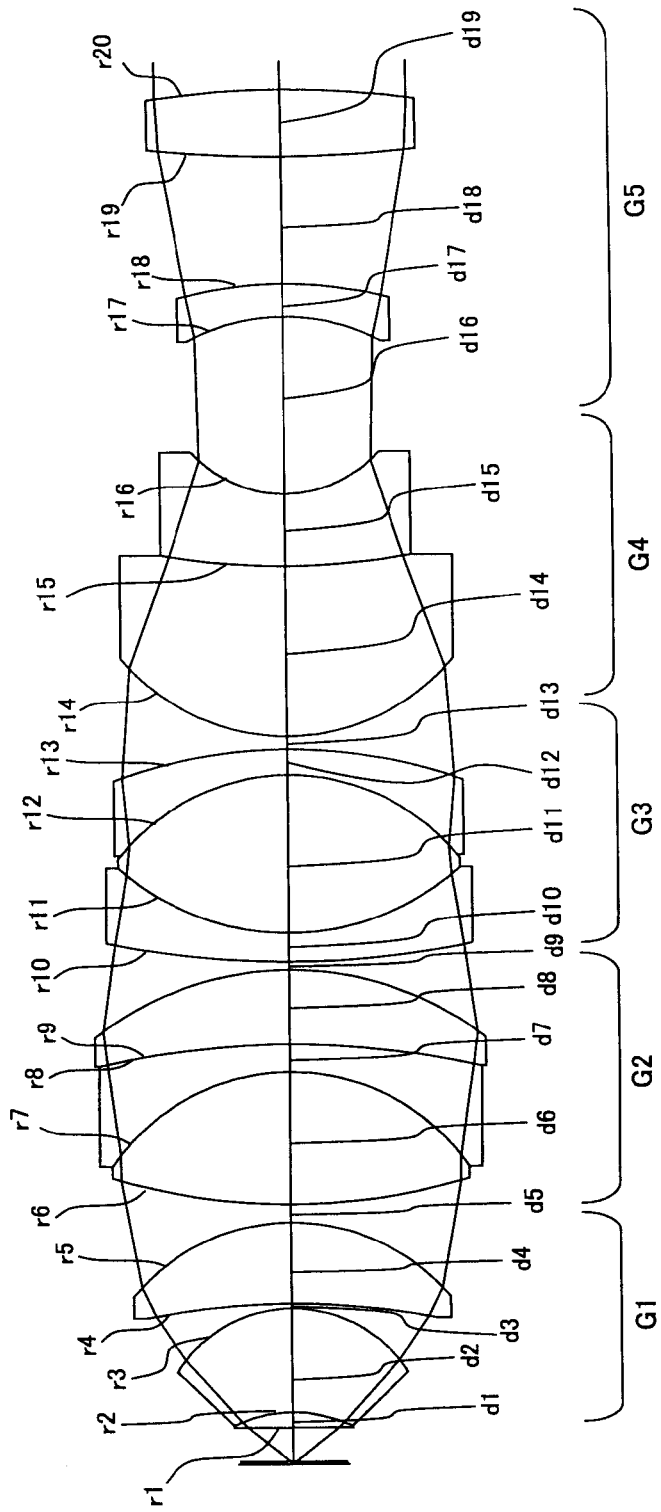
FIG. 6 is the cross-sectional view of the lens element and group configuration of an immersion microscope objective according to Embodiment 6 of the present invention.

In Embodiment 5, as shown in the cross-sectional view of FIG. 5, the first lens group G1 is composed of a doublet (consisting of a plano-convex lens element and a meniscus lens element with its concave surface on the object side) and a bi-convex lens element. The second lens group G2 is composed of a triplet consisting of a bi-convex lens element, a plano-concave lens element with its concave lens element on the object side and a plano-concave lens element. The third lens group G3 is composed of a triplet consisting of a meniscus lens element with its concave surface on the image side, a bi-convex lens element and a meniscus lens element with its concave surface on the object side. The fourth lens group G4 is composed of a doublet consisting of a convex lens element and two concave lens elements. The fifth lens group G5 is composed of a meniscus lens elements with its concave surfaces on the object side and a biconvex lens.

In this embodiment, the third lens group G3 moves along the optical axis relative to the second and fourth lens group G2 and G4 in order to correct aberrations.

The lens data of Embodiment 5 is shown below in Table 13.
The top line of Table 13 below lists the numerical aperture NA, the working distance WD in mm (for the index of refraction of a medium being 1.36 and the thickness of a specimen being 0.3 mm), the focal length f in mm, and the magnification β. In the columns of Table 13 are listed the surface number #, in order from the object side, the radius of curvature r in mm of the optical surface, the on-axis surface spacing d in mm between surfaces, the refractive index nd (at the d-line) and the Abbe number vd (relative to the d-line) of the immersion microscope objective of Embodiment 5.

TABLE 13

NA = 1.05; WD = 1.8048; medium thickness = 0.3 mm; medium nd = 1.36; f = 7.134036; β = 25

| # | r | d | nd | vd |
|---|---|---|---|---|
| 1 | INF | 0.92 | 1.45852 | 67.83 |
| 2 | −5.1557 | 6.3714 | 1.7725 | 49.6 |
| 3 | −7.0345 | 0.6255 | | |
| 4 | 75.6448 | 5 | 1.56907 | 71.3 |
| 5 | −17.8511 | 0.5476 | | |
| 6 | 35.866 | 7.9936 | 1.497 | 81.14 |
| 7 | −13.5584 | 2.1075 | 1.673 | 38.15 |
| 8 | INF | 5.3826 | 1.43875 | 94.93 |
| 9 | −18.9286 | 0.5958 | | |
| 10 | 53.4526 | 1.8974 | 1.61336 | 44.49 |
| 11 | 13.6516 | 9.8713 | 1.43875 | 94.97 |
| 12 | −11.2095 | 1.9033 | 1.72916 | 54.68 |
| 13 | −26.2738 | 1.2027 | | |
| 14 | 10.096 | 10.2751 | 1.497 | 81.14 |
| 15 | −35.0452 | 2.1608 | 1.741 | 52.64 |
| 16 | 6.1297 | 4.0132 | | |
| 17 | −9.2205 | 2.2003 | 1.61336 | 44.49 |
| 18 | −23.5 | 7.2144 | | |
| 19 | 74.109 | 3.8 | 1.673 | 38.15 |
| 20 | −27.2713 | 1.471 | | |

Table 14 below lists the condition number, the variable of interest listed in the condition, and the value of that variable in Embodiment 5.

TABLE 14

| (1) | h1/h0 = 0.782058484 |
|---|---|
| (2) | h2/h = 0.521842174 |
| (3) | h3/h1 = 0.914280088 |
| (4) | f4/f5 = −0.329806896 |
| (4') | Ro4/h1 = 1.223314189 |
| (5) | |f/f3| = 0.010885278 |
| (6) | |f2/f3| = 0.065545067 |
| (7) | |β3| = 0.871130021 |
| (8) | f/f2 = 0.166073182 |
| (9) | Do/f = 10.81388957 |
| (10) | NA × f = 7.576731872 |
| (11), (12) | |(tanω1)(tanω1 + 2/h4) − (tanω2)(tanω2 + 2/h5)| = 0.002439354 |
| (13) | do + di = 1.79854 |
| (14) | |βs| = 0.871130021 |
| (15) | (n2 − n1)/ra = 0.060909285 |
| (16) | dt1/f = 0.285708881 |
| (17) | dt2 = 0.6255 |
| (18) | nd5p = 1.673 |
| (19) | vd5p = 38.15 |
| (20) | vpa − vna = 25.4925 |
| (21) | n1 − nw = 0.129 |
| (22) | rb/dt3 = 1.64 |
| (23) | fs/f = 1.91 |
| (24) | dt5 − dt4 = 5.45 |

In the above configuration, the third lens group (having surfaces with the radii of curvatures r10 to r13) is moved in order to correct aberrations resulting from the presence/absence of cover glass, the observation depth in the specimen and the observation wavelength.

The on-axis position of the second group along the optical axis varies according to the depth of the observation in the specimen and is given in Table 15 below. The on-axis position of the second lens group G2 is indicated (to less precision) by the surface spacings d9 and d13 in the lens data of Table 10 above, which corresponds (for a medium thickness of 0.3 mm) to the values do and di in Table 15 below.

TABLE 15

| | medium thickness | | |
|---|---|---|---|
| | 0.0 mm | 0.3 mm | 1.2 mm |
| WD | 2.05514 | 1.76073 | 0.87742 |
| distance before the movable group, do | 0.46698 | 0.46698 | 0.91827 |
| distance after the movable group, di | 1.33155 | 1.20271 | 0.88026 |
| do + di | 1.79853 | 1.79854 | 1.79853 |

The refractive index nd of the medium (at the d-line) was 1.36.

Embodiment 5 is an immersion microscope objective for infinite optical systems, from which light is emitted as a parallel light flux, and is used in combination with an imaging lens shown in the cross-sectional view of FIG. 25.

Figure 19:
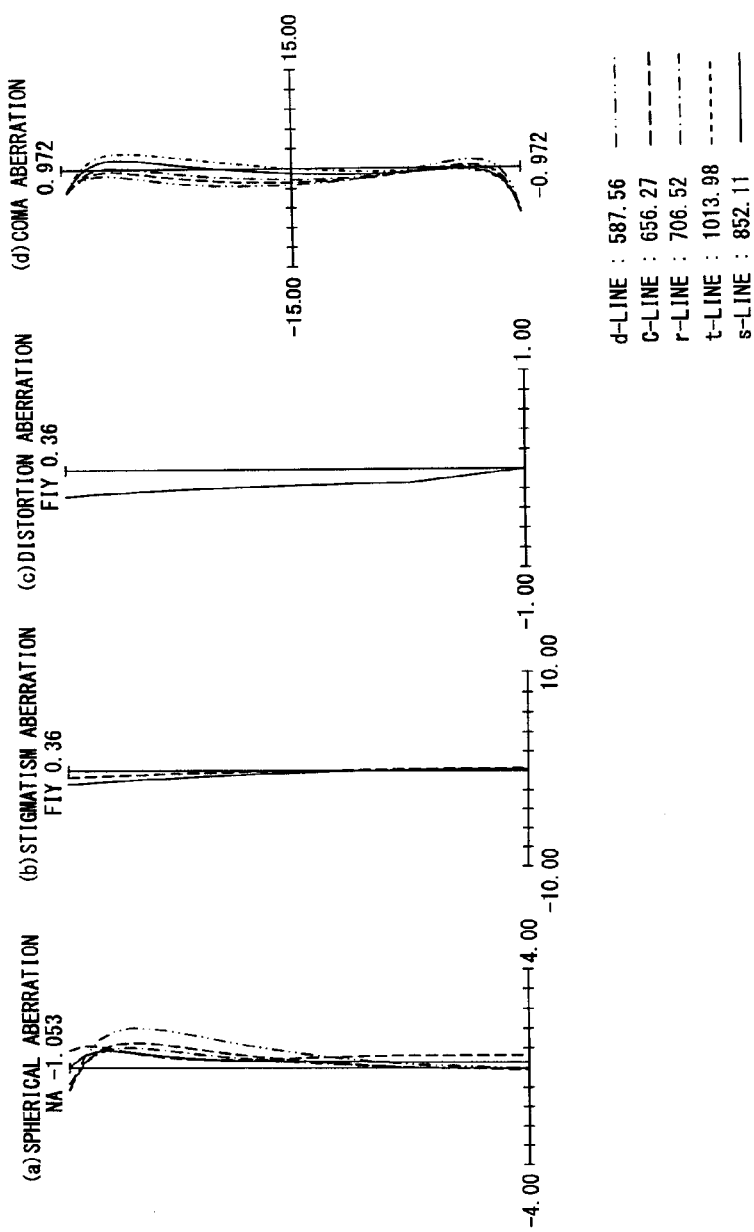
FIGS. 19A-19D show the spherical aberration, astigmatism, distortion, and coma, respectively, of the immersion microscope objective shown in FIG. 5 when the specimen thickness is 0.0 mm.
Figure 20:
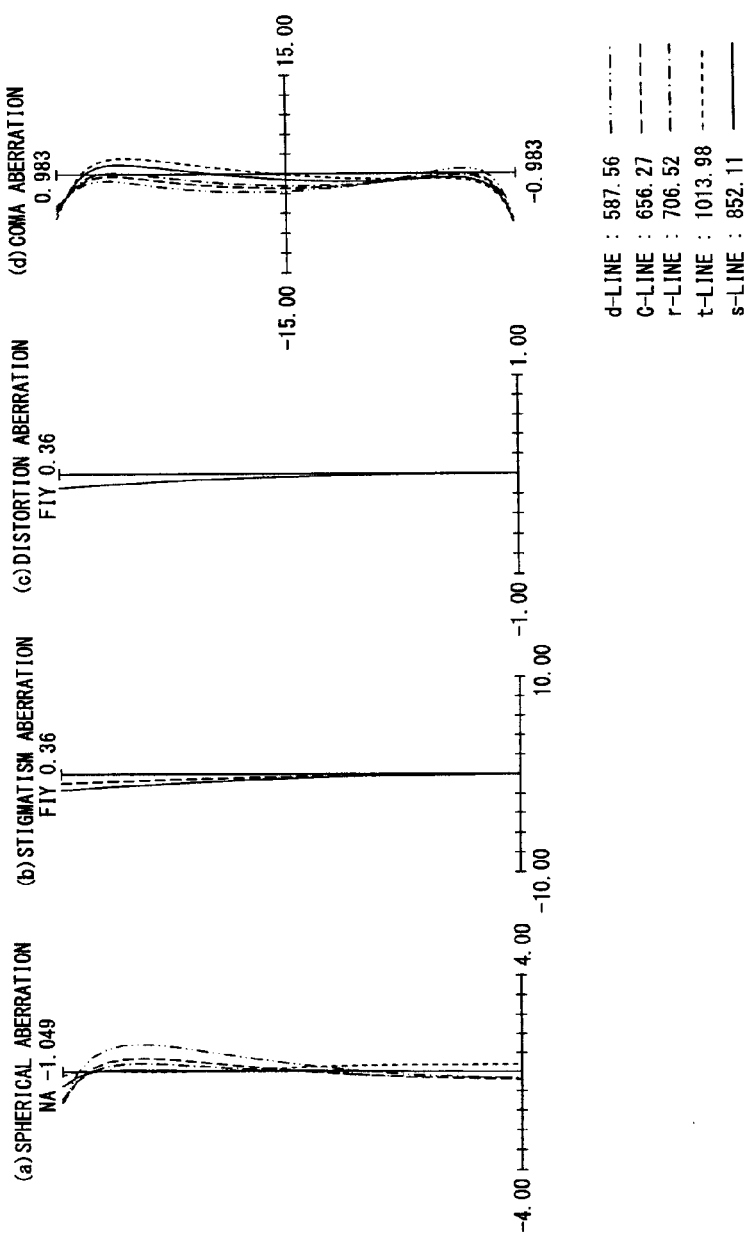
FIGS. 20A-20D show the spherical aberration, astigmatism, distortion, and coma, respectively, of the immersion microscope objective shown in FIG. 5 when the specimen thickness is 0.3 mm.
Figure 21:
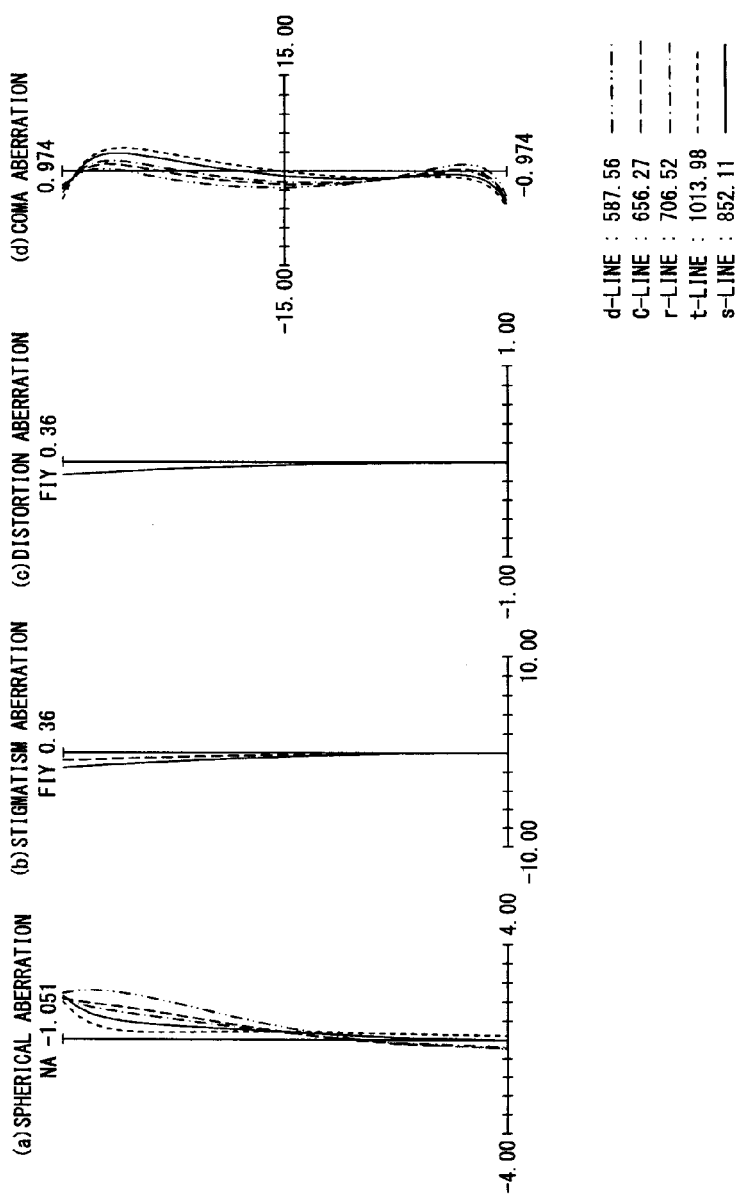
FIGS. 21A-21D show the spherical aberration, astigmatism, distortion, and coma, respectively, of the immersion microscope objective shown in FIG. 5 when the specimen thickness is 1.2 mm.

FIGS. 19A-19D, 20A-20D and 21A-21D show various visible light aberrations of the immersion microscope objective according to Embodiment 3 when the depth in the specimen is 0.0 mm, 0.3 mm and 1.2 mm, respectively. FIGS. 19A, 20A and 21A show spherical aberration, in mm (abscissa) versus the image height IH, in mm (ordinate). FIGS. 19B, 20B and 21B show astigmatism, in mm (abscissa) versus the image height IH, in mm (ordinate). FIGS. 19C, 20C and 21C show distortion aberration, in mm (abscissa) versus the image height IH, in nun (ordinate). FIGS. 19D, 20D and 21D show coma aberration, in mm (abscissa) versus the image height IH, in mm (ordinate). The specimen had a refractive index of 1.36 at the d-line and an Abbe number (relative to the d-line) of 58. The water filling the specimen and the leading end of the immersion microscope objective had a refractive index of 1.33422 at the d-line and an Abbe number (relative to the d-line) of 55.89. The third lens group is movable and was positioned as shown in Table 15 above.

Embodiment 6

In Embodiment 6, as shown in the cross-sectional view of FIG. 5, the first lens group G1 is composed of a doublet (consisting of a plano-convex lens element) and a meniscus lens element and a bi-convex lens element. The second lens group G2 is composed of a triplet consisting of a bi-convex lens element, a meniscus lens element with its concave lens element on the object side and a meniscus lens element. The third lens group G3 is composed of a triplet consisting of a meniscus lens element with its concave surface on the image side, a bi-convex lens element and a meniscus lens element with its concave surface on the object side. The fourth lens group G4 is composed of a doublet consisting of two meniscus lens elements with their concave on the image side. The fifth lens group G5 is composed of a meniscus lens elements with its concave surfaces on the object side and a biconvex lens.

In this embodiment, the second and third lens groups G2 and G3 moves along the optical axis relative to the first and fourth lens group G1 and G4 in order to correct aberrations.

The lens data of Embodiment 6 is shown below in Table 16.

The top line of Table 16 below lists the numerical aperture NA, the working distance WD in mm (for the index of refraction of a medium being 1.36 and the thickness of a specimen being 0.3 mm), the focal length f in mm, and the magnification β. In the columns of Table 16 are listed the surface number #, in order from the object side, the radius of curvature r in mm of the optical surface, the on-axis surface spacing d in mm between surfaces, the refractive index nd (at the d-line), and the Abbe number vd (relative to the d-line) of the immersion microscope objective of Embodiment 6.

TABLE 16

NA = 1.06; WD = 1.6846; medium thickness = 0.3 mm; medium nd = 1.36; f = 7.2041; β = 25

| # | r | d | nd | vd |
|---|---|---|---|---|
| 1 | INF | 0.92 | 1.45852 | 67.83 |
| 2 | −8.3317 | 6.3714 | 1.7725 | 49.6 |
| 3 | −8.1014 | 0.2884 | | |
| 4 | −44.2568 | 5 | 1.56907 | 71.3 |
| 5 | −12.2608 | 0.9519 | | |
| 6 | 37.9764 | 7.8376 | 1.497 | 81.14 |
| 7 | −13.1109 | 1.6833 | 1.673 | 38.15 |
| 8 | −51.2909 | 4.5572 | 1.43875 | 94.93 |
| 9 | −18.8909 | 0.4909 | | |
| 10 | 50.7843 | 1.8173 | 1.61336 | 44.49 |
| 11 | 15.4861 | 9.3702 | 1.43875 | 94.97 |
| 12 | −13.2615 | 1.5 | 1.72916 | 54.68 |
| 13 | −31.4258 | 0.8997 | | |
| 14 | 13.0111 | 10.2751 | 1.497 | 81.14 |
| 15 | 42.2409 | 4.2428 | 1.741 | 52.64 |
| 16 | 7.7259 | 10.5896 | | |
| 17 | −12.0786 | 1.985 | 1.63775 | 42.41 |
| 18 | −24.4346 | 7.6247 | | |
| 19 | 73.9503 | 3.9403 | 1.738 | 32.26 |
| 20 | −57.1062 | −2.5 | | |

Table 17 below lists the condition number, the variable of interest listed in the condition, and the value of that variable in Embodiment 6.

TABLE 17

| (1) | h1/h0 = 0.845668559 |
| (2) | h2/h = 0.542324369 |
| (3) | h3/h1 = 0.800138675 |
| (4) | f4/f5 = −0.22179378 |
| (4') | Ro4/h1 = 1.362835501 |
| (5) | |f/f3| = 0.01899509 |
| (6) | |f2/f3| = 0.101410126 |
| (8) | f/f2 = 0.187309599 |
| (9) | Do/f = 11.14710447 |
| (10) | NA × f = 7.555540563 |
| (11), (12) | |(tanω1)(tanω1 + 2/h4) − (tanω2)(tanω2 + 2/h5)| = 0.000957149 |
| (13) | do + di = 1.8516 |
| (14) | |βs| = 2.74815908 |
| (15) | (n2 − n1)/ra = 0.037690987 |
| (16) | dt1/f = 0.274817927 |
| (18) | nd5p = 1.72021 |
| (19) | vd5p = 32.26 |
| (20) | vpa − vna = 25.17225 |
| (21) | n1 − nw = 0.129 |
| (22) | rb/dt3 = 2.71 |
| (23) | fs/f = 1.97 |
| (24) | dt5 − dt4 = 5.45 |

In the above configuration, the second and third lens groups (having surfaces with the radii of curvatures r6 to r13) is integrally moved in order to correct aberrations resulting from the presence/absence of cover glass, the observation depth in the specimen and the observation wavelength.

The on-axis position of the second group along the optical axis varies according to the depth of the observation in the specimen and is given in Table 18 below. The on-axis position of the second lens group G2 is indicated (to less precision) by the surface spacings d9 and d13 in the lens data of Table 10 above, which corresponds (for a medium thickness of 0.3 mm) to the values do and di in Table 18 below.

TABLE 18

| | medium thickness | | |
|---|---|---|---|
| | 0.0 mm | 0.3 mm | 1.2 mm |
| WD | 1.97226 | 1.68462 | 0.821 |
| distance before the movable group, do | 1.09052 | 0.95192 | 0.54639 |
| distance after the movable group, di | 0.76921 | 0.89968 | 1.307 |
| do + di | 1.85973 | 1.8516 | 1.85339 |

The refractive index nd of the medium (at the d-line) was 1.36.

Embodiment 6 is an immersion microscope objective for infinite optical systems, from which light is emitted as a parallel light flux, and is used in combination with an imaging lens shown in the cross-sectional view of FIG. 25.

Figure 22:
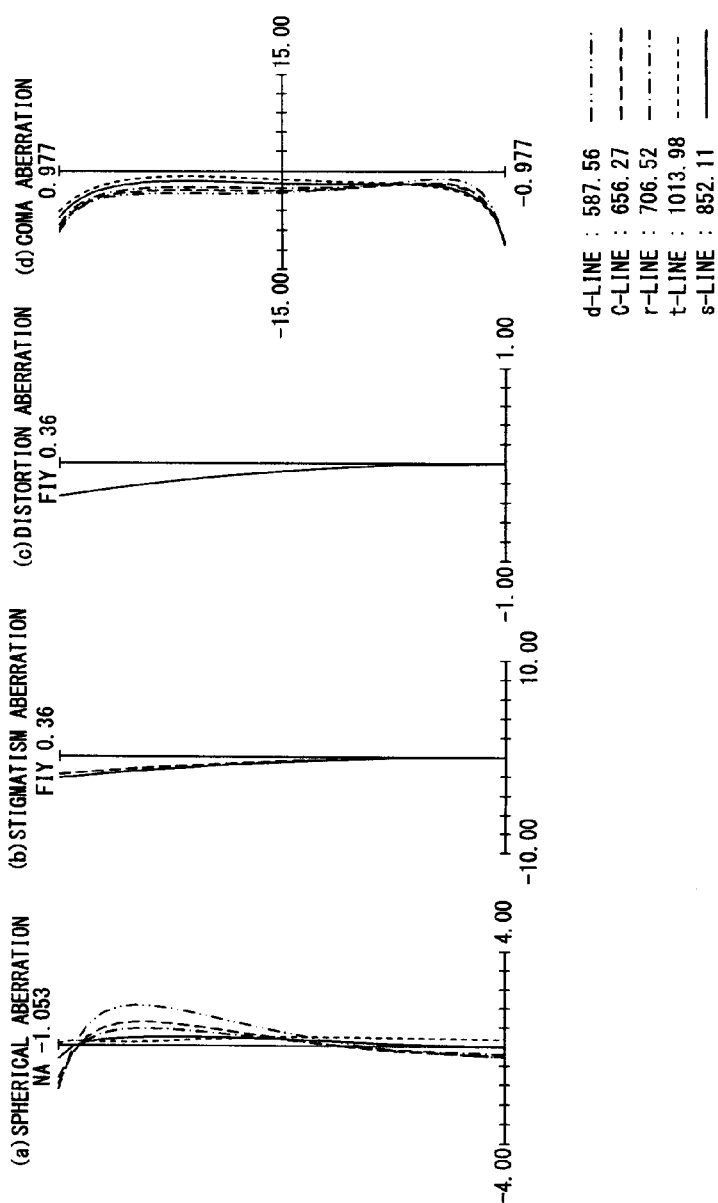
FIGS. 22A-22D show the spherical aberration, astigmatism, distortion, and coma, respectively, of the immersion microscope objective shown in FIG. 6 when the specimen thickness is 0.0 mm.
Figure 23:
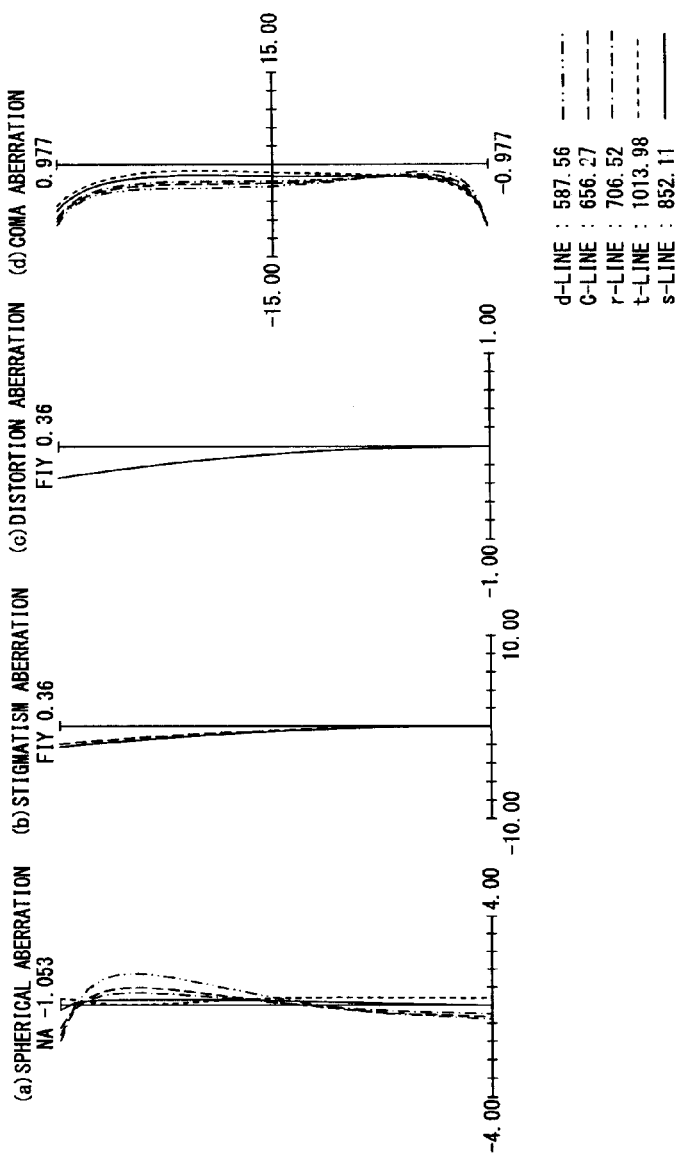
FIGS. 23A-23D show the spherical aberration, astigmatism, distortion, and coma, respectively, of the immersion microscope objective shown in FIG. 6 when the specimen thickness is 0.3 mm.
Figure 24:
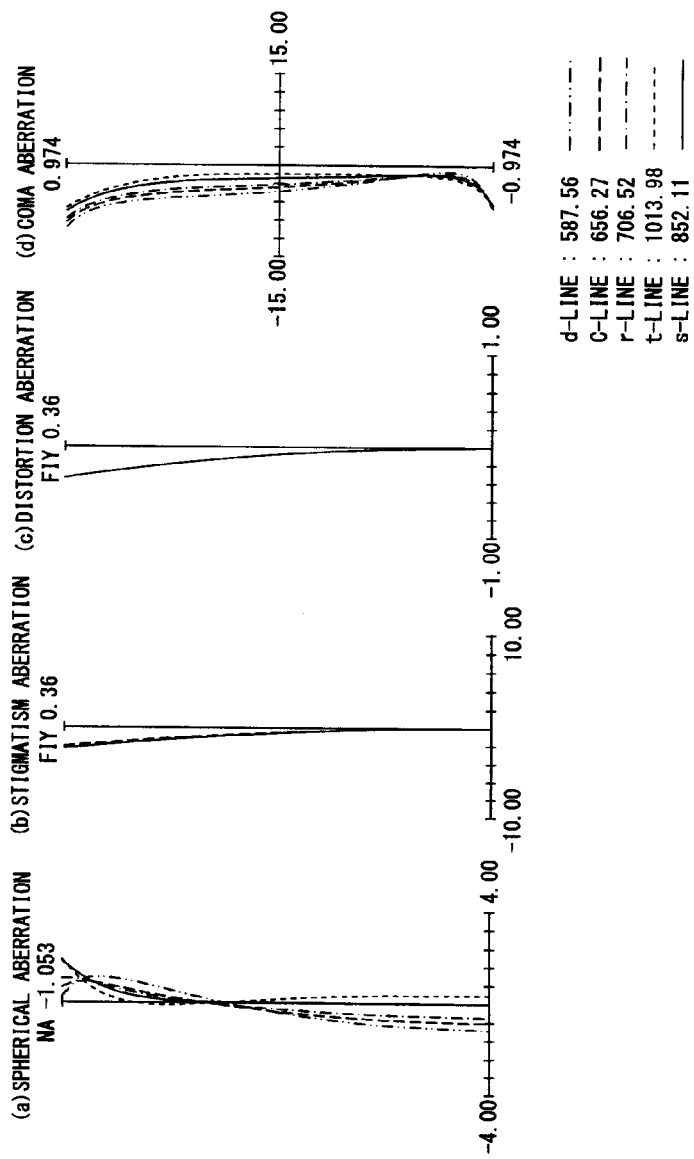
FIGS. 24A-24D show the spherical aberration, astigmatism, distortion, and coma, respectively, of the immersion microscope objective shown in FIG. 6 when the specimen thickness is 1.2 mm.

FIGS. 22A-22D, 23A-23D and 24A-24D show various visible light aberrations of the immersion microscope objective according to Embodiment 3 when the depth in the specimen is 0.0 mm, 0.3 mm and 1.2 mm, respectively. FIGS. 22A, 23A and 24A show spherical aberration, in mm (abscissa) versus the image height IH, in mm (ordinate). FIGS. 22B, 23B and 24B show astigmatism, in mm (abscissa) versus the image height IH, in mm (ordinate). FIGS. 22C, 23C and 24C show distortion aberration, in mm (abscissa) versus the image height IH, in mm (ordinate). FIGS. 22D, 23D and 24D show coma aberration, in mm (abscissa) versus the image height IH, in mm (ordinate). The specimen had a refractive index of 1.36 at the d-line and an Abbe number (relative to the d-line) of 58. The water filling the specimen and the leading end of the immersion microscope objective had a refractive index of 1.33422 at the d-line and an Abbe number (relative to the d-line) of 55.89. The third lens group is movable and was positioned as shown in Table 18 above.

As mentioned previously, Embodiments 1 to 6 are all infinite distance immersion microscope objectives from which light emerges as a parallel light flux. Thus, these immersion microscope objectives do not form images by themselves. Rather, they are used in combination with an imaging lens such as the one shown in cross-sectional view in FIG. 25. Table 19 below lists: the radii of curvature r1, r2, etc., of the lens surfaces in order from the object side; the values d1, d2, etc., are the distances between lens surfaces on the optical axis, in order from the object side; the values nd1, nd2, etc., are the refractive indices at the d-line, in order from the object side; and the values vd1, vd2, etc., are the Abbe numbers (relative to the d-line) of the optical material of the lens elements in order from the object side.

TABLE 19

| r1 = 68.7541 | d1 = 7.7321 | nd1 = 1.48749 | vd1 = 70.21 |
| r2 = −37.5679 | d2 = 3.4742 | nd2 = 1.8061 | vd2 = 40.95 |
| r3 = −102.848 | d3 = 0.6973 | | |
| r4 = 84.3099 | d4 = 6.0238 | nd3 = 1.834 | vd3 = 37.17 |
| r5 = −50.71 | d5 = 3.0298 | nd4 = 1.6445 | vd4 = 40.82 |
| r6 = 40.6619 | d6 = 9.0375 | | |

The distance between the immersion microscope objectives of Embodiments 1 to 6 and the imaging lens shown in FIG. 25 can be between 50 mm and 170 mm. The aberration charts of FIGS. 7A to 24D were obtained with the distance being 120 mm. Similar aberrations are obtained when the distance is between 50 mm and 170 mm.

Embodiment 7

Figure 26:
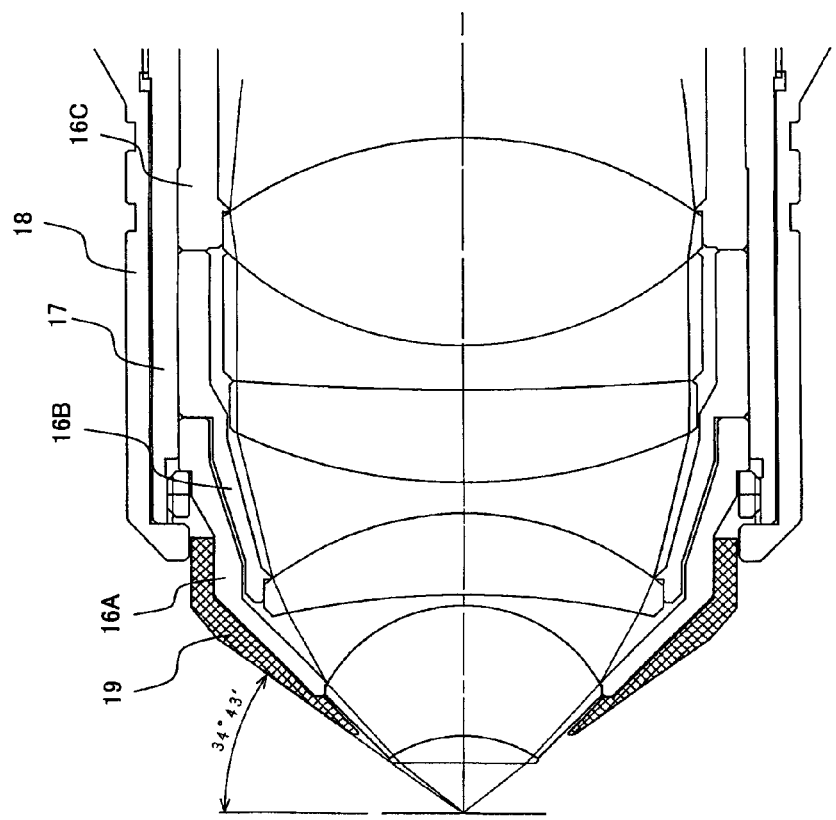
FIG. 26 shows a configuration example of a lens frame in the immersion microscope objective of Embodiment 1.

FIG. 26 shows a configuration comprising a lens frame and a lens barrel in the preferred embodiment of the present invention. In the configuration of the lens frame of the immersion microscope objective shown in FIG. 26, the lens configuration based on the lens data described in Embodiment 1 of the present invention is referenced.

As shown in FIG. 26, in the immersion microscope objective of the present invention, each cemented lens or single lens are supported by lens frames 16A, 16B, 16C and the like. The lens frames 16A, 16B, 16C and the like are stacked inside the lens barrel 17 and each lens is disposed in a prescribed position. Furthermore, the lens frame 16 is protected by a cover barrel 18.

An immersion microscope objective according to the preferred embodiment of the present invention has a shape suitable for a microscope observation method in which a specimen is accessed during microscope observation, such as patch clamping. Specifically, the leading end on the object side of the immersion microscope objective is sharpened and a working space is secured. The so-called access angle of the preferred embodiment of the present invention is 34° 43'.

Furthermore, in the preferred embodiment of the present invention, not only sharpening the leading end, but also covering it with an insulation cover prevents it from being interfered by experiment tools. Patching clamping uses an electrode in order to detect weak current in the specimen. Therefore, it is very important to insulate the immersion microscope objective. The lens frame and lens barrel of an ordinary microscope is made of brass. In the preferred embodiment of the present invention, the microscope is insulted from the specimen and the experiment tools by covering the lens frame at the top end with an insulation cover 19.

Embodiment 8

Figure 27:
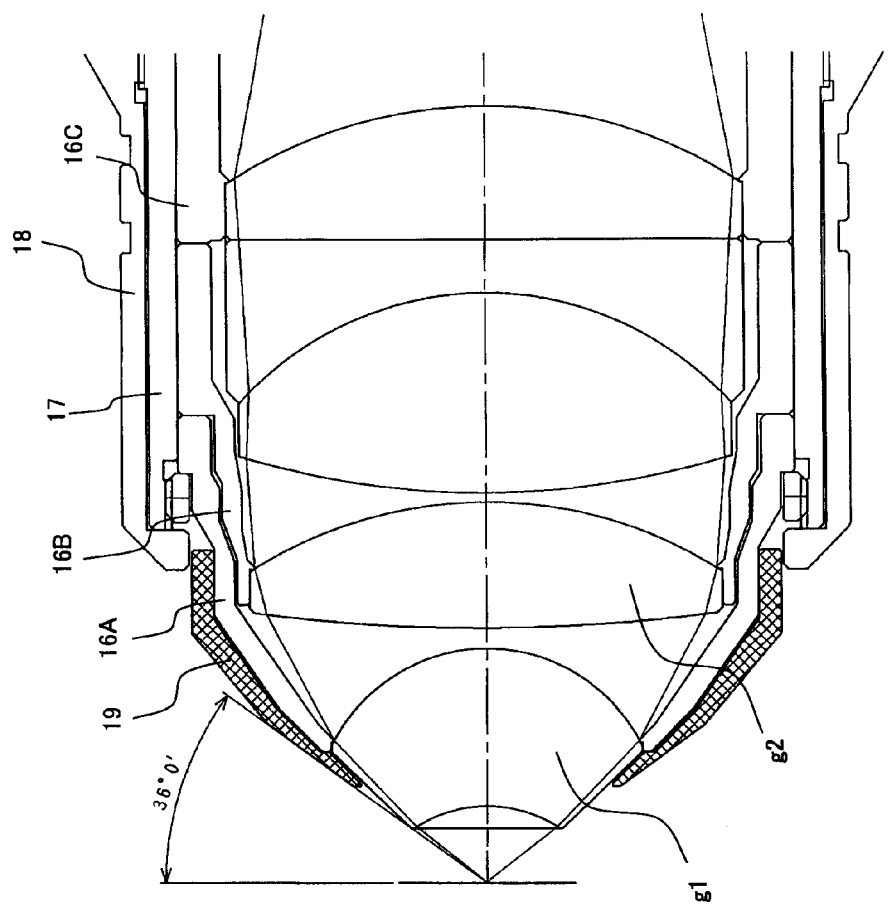
FIG. 27 shows a configuration example of a lens frame in the immersion microscope objective of Embodiment 3.

FIG. 27 shows a configuration comprising a lens frame and a lens barrel in the preferred embodiment of the present invention. In the configuration of the lens frame of the immersion microscope objective shown in FIG. 27, the lens configuration based on the lens data described in Embodiment 3 of the present invention is referenced.

As shown in FIG. 27, in the immersion microscope objective of the present invention, each cemented lens and single lens are supported by lens frames 16A, 16B, 16C and the like. Therefore, the lens frames 16A, 16B, 16C and the like are stacked inside the lens barrel 17. Hence each lens is disposed in a prescribed position. Furthermore, the lens frame 16 is insulted by a cover barrel 18.

The leading end on the object side of the immersion microscope objective in this preferred embodiment of the present invention is sharpened and the lens frame 16A at the leading end is covered with an insulation cover 19.

Furthermore, in the lens configuration of Embodiment 3, the second lens group g2 from the object side is a bi-convex lens. As a result, the rim of the second lens group g2 is separate from a lens group g1 on the most object side. Therefore, the lens group g1 can be supported from further inside by the lens frame 16A of this preferred embodiment of the present invention. As a result, in this preferred embodiment of the present invention, not only the access angle can be increased but a large working space can be secured in the vicinity of the junction of the insulation cover 19 and the cover 18. In this case, the first lens group G1 described in Embodiment 3 is divided into the utmost object-side lens group g1 and the second object-side lens group g2 and is described.

Preferred embodiments of laser scanning microscope systems that use the immersion microscope objective of the present invention will now be described.

Embodiment 9

FIG. 28 illustrates a laser scanning microscope system of the present invention using the immersion microscope objective of the present invention. Illumination laser light that is introduced from a laser source (not shown) is scanned by a galvanometer mirror 1, relayed by a pupil projection lens 2 and an imaging lens 3, and enters an immersion microscope objective 4. The galvanometer mirror 1 folds the incident laser light by 90 degrees In other words, the angles of incidence and reflectance relative to the normal to the mirror surface are each approximately 45 degrees. The galvanometer mirror 1, pupil projection lens 2 and imaging lens 3 form a confocal detection system optical path that receives reflected light from the specimen that has been split off to this optical path using the dichroic mirror 5. In addition, the dichroic mirror 5 directs light to the specimen not only from the laser source (not shown) but also from a non-scanning illumination introducing optical system 15.

Assuming that the galvanometer mirror 1 measures 6 mm×6 mm, the pupil projection lens 2 has a focal length of 50 mm, and the imaging lens 3 has a focal length of 180 mm, the laser beam emerging from the galvanometer mirror 1 towards the specimen has a beam diameter of 6×sin 45° and the beam entering the immersion microscope objective has the following beam diameter:

$$\text{Beam diameter} = (6 \times \sin 45°) \times ft1/fp1 = 15.27 \text{ mm}.$$

Of course, the laser beam deflection means need not be restricted to a galvanometer mirror 1 and may instead be formed of an acousto-optical element, an electro-optical element or other known laser beam deflection means, such as holograms on a rotating wheel.

In this embodiment of a laser scanning microscope system, when the immersion microscope objective of Embodiment 1 is used, the pupil diameter is 2×NA×f=15.12 mm. Thus, the pupil diameter and beam diameter are substantially equal. In other words, this structure has a pupil diameter that allows efficient use of the light beam.

There also exists a non-confocal detection system optical path that is different from the confocal detection system optical path. In this embodiment, light is directed to the non-confocal detection system optical path by a mirror 7 (that may be selectively inserted into the path of light from the specimen) and the non-confocal detection system optical path is positioned farther away from the immersion microscope objective 4 than is the confocal detection system optical path.

The non-confocal detection system optical path includes a first pupil projection lens 8, a laser cut-off filter 9, barrier filters 10, 10, second pupil projection lenses 11, 11 and detectors 12, 12. In this embodiment, a dichroic mirror 13 is used for two-channel detection. The detectors 12, 12 are desirably photoelectrical amplifiers for detecting weak fluorescence.

The first pupil projection lens 8 and second pupil projection lenses 11, 11 project the pupil of the immersion microscope objective 4 onto a detection surface of the detectors 12, 12. The laser cut-off filter 9 eliminates infrared light used as excitation light. The barrier filters 10, 10 block wavelengths other than the light wavelengths to be detected.

As mentioned briefly above, this embodiment also includes a wide field of view illumination optical system, wherein a dichroic mirror 14 is provided between the imaging lens 3 and the pupil projection lens 2 in order to introduce illumination light from a non-scanning illumination introducing optical system 15. The dichroic mirror 14 is detachably provided and can be made suitable for a wide field of view illumination. With this structure, the three detection systems and the wide field of view illumination optical system may be independently switched so that it becomes easy to observe a specimen while stimulating its surface.

Embodiment 10

FIG. 29 illustrates another embodiment of the laser scanning microscope system of the present invention using the immersion microscope objective of the present invention. Embodiment 6 differs from Embodiment 5 in that, in this embodiment, the non-confocal detection system optical path is positioned closer to the immersion microscope objective 4 than is the confocal detection system optical path.

Consequently, fluorescence collected by the immersion microscope objective 4 is reflected by the dichroic mirror 5 to the non-confocal detection system optical path. As in Embodiment 5, the non-confocal detection system optical path is formed of a first pupil projection lens 8, a laser cut-off filter 9, barrier filters 10, 10, second pupil projection lenses 11, 11, and detectors 12, 12.

On the other hand, the light from the immersion microscope objective may be switched, by selectively inserting a mirror 7 into the optical path, so as to direct light from the specimen to either a visual observation system 6 (also seen in FIG. 28 for Embodiment 7) or to the confocal detection system optical path. As in Embodiment 7, the confocal detection system optical path is formed of a galvanometer mirror 1, a pupil projection lens 2, an imaging lens 3, a non-scanning illumination introducing optical system 5, and a dichroic mirror 14.

Optical characteristics of the non-confocal detection system used in Embodiments 7 and 8 will now be described with reference to FIG. 30.

Figure 30:
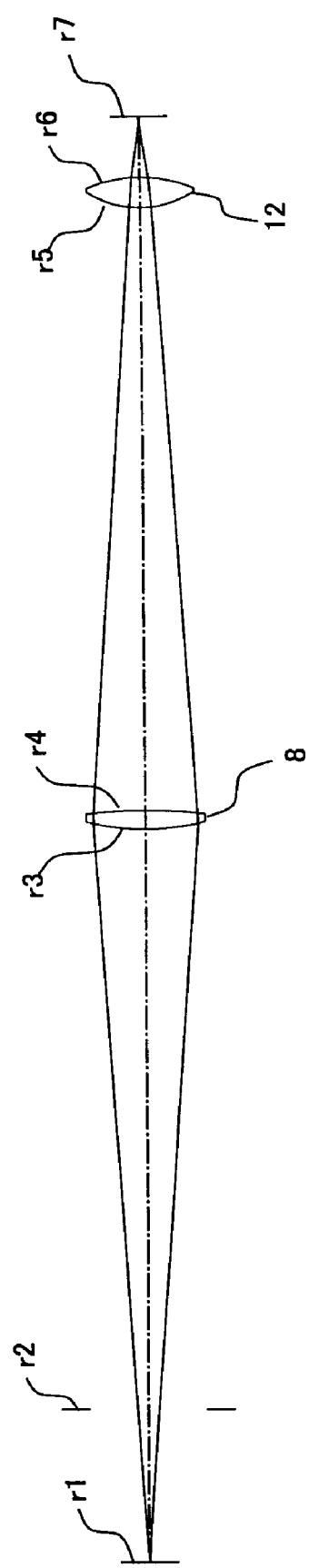

In FIG. 30, r1 is the radius of curvature of the pupil plane of the immersion microscope objective, r2 is the radius of curvature of the mounting plane of the immersion microscope objective, r3 and r4 are the radii of curvature of the lens surfaces of the first pupil projection lens 8, r5 and r6 are the radii of curvature of the lens surfaces of the second pupil projection lens 12, and r7 is the radius of curvature of the detection surface of the detector.

Table 20 below lists, in order from the object side, the surface number #, the radius of curvature r in mm, the on-axis surface spacing d in mm, the refractive index nd (at the d-line), and the Abbe number vd (relative to the d-line) that pertain to the components shown in FIG. 30.

TABLE 20

| # | r | d | nd | vd |
|---|---|---|---|---|
| 1 | INF | 50 | 1 | |
| 2 | INF | 192.2 | 1 | |
| 3 | 90 | 6 | 1.48915 | 70.23 |
| 4 | −200 | 197.8 | 1 | |
| 5 | 35 | 10 | 1.51825 | 64.24 |
| 6 | −50 | 20 | 1 | |
| 7 | INF | 0 | 1 | |

As seen from the figure, the light converges between the first and second pupil projection lenses 8 and 12. The laser scanning microscope of the present invention is designed to have an immersion microscope objective with a large field of view so as to detect as much scattered light as possible and to efficiently guide fluorescence collected by the immersion microscope objective to the detector. Fluorescence collected from positions in the specimen away from the optical axis emerges from the immersion microscope objective at large angles. In this case, the first pupil projection lens 8 having d large diameter efficiently guides the fluorescence. Then, the subsequent converging light is guided to the detector at preferable illumination angles and the optical system can be made small in size.

On the other hand, filters such as laser cut-off, dichroic, and barrier filters may be provided between the first and second pupil projection lenses 8 and 12. Therefore, it is ideal that the light between the first And second pupil projection lenses 8 and 12 is collimated.

Combining the above two factors, the beam has an angle of 4 degree in this structure. The conversing beam does not affect the spectral characteristics of the filters. The detector in this embodiment has a large numerical aperture NAe of 0.0736, thereby substantially increasing the fluorescence observation range.

In addition, the value of $\gamma em/\gamma ex$ in Condition (26') is 1.55 in the laser scanning microscope system in the present embodiment with the immersion microscope objective described in embodiment 1. That is, non-confocal detection optical system has a lager detection field of view than the laser beam scanning range it is easy to check that the immersion microscope objectives in the other embodiments also satisfy Condition (26') since the other immersion microscope objectives have substantially same pupil diameters.

The lens data of the pupil projection lens 2 used in Embodiments 7 and 8 are given in Table 21 below. (The column headings are the same as discussed above for Table 14). In the lens data below, the first surface is the galvanometer mirror surface and the 10th surface is the primary image position. The pupil projection lens 2 used in these embodiments is constituted by, in order from the galvanometer mirror side, a doublet consisting of a meniscus lens element and a biconvex lens element, a doublet consisting of a biconvex lens element and a biconcave lens element, and a meniscus lens with its concave surface on the primary image side.

TABLE 21

| # | r | d | nd | vd |
|---|---|---|---|---|
| 1 | INF | 55.64 | 1 | |
| 2 | 169.5554 | 4.6279 | 1.7859 | 44.2 |
| 3 | 54.3199 | 7.5898 | 1.883 | 40.76 |
| 4 | −54.3199 | 0.8701 | 1 | |
| 5 | 38.8719 | 8.1452 | 1.497 | 81.54 |
| 6 | −46.855 | 6.7568 | 1.78472 | 25.71 |
| 7 | 22.8518 | 3.2673 | 1 | |
| 8 | 26.3894 | 9.2559 | 1.80518 | 25.43 |
| 9 | 62.8196 | 24.2689 | 1 | |
| 10 | INF | | | |

Embodiment 11

Figure 32:
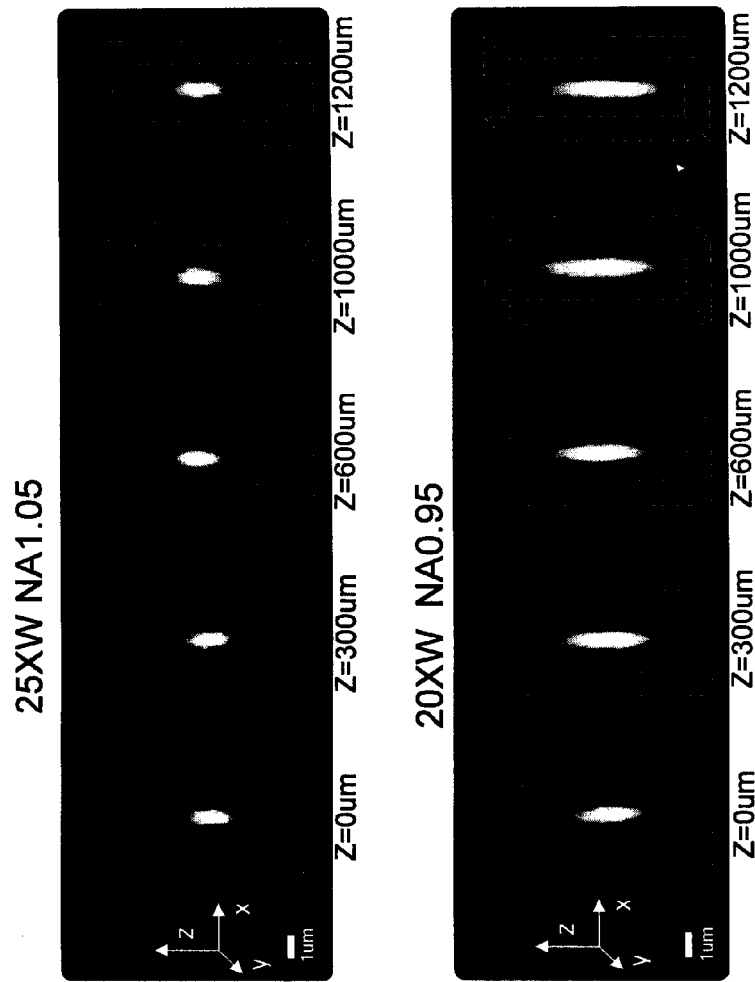
FIG. 32 is a multi-photon excitation observation image obtained by using an objective meeting the present invention and an object not meeting the present invention.

An immersion microscope objective meeting the present invention was substantially developed and the effect was confirmed by conducting multi-photon excitation observation. FIG. 32 shows images obtained by burying a fine fluorescence bead in the specimen in order to measure the resolution performance of the immersion microscope objective in a living body, mounting the immersion microscope objective on a two-photon microscope and modifying the observation depth from the specimen surface (Z=0 μm) up to the specimen depth (Z=1200 μm).

Images in the upper column are obtained by the immersion microscope objective (NA=1.05, magnification β=25) meeting the present invention and ones in the lower column are obtained by the immersion microscope objective (NA=0.95, magnification β=20) meeting the configuration of Japanese Laid-Open Patent Application No. 2002-31760.

As in Embodiment 9, the laser deflection means of this embodiment uses a galvano-mirror and the maximum input beam diameter (S×ft1/fp1) defined by this is 15.27 mm.

Since the pupil diameter 2×NA×f of the immersion microscope objective (NA=1.05, magnification β=25) corresponding to the upper column is 15.12 mm, the value of Condition 25 becomes 0.99.

However, since the pupil diameter 2×NA×f of the immersion microscope objective (NA=0.95, magnification β=20) corresponding to the upper column is 17.1 mm, the value of Condition 25 becomes 1.12.

In FIG. 32, when comparing images obtained on the specimen surface (Z=0 μm) not affected by the spherical aberration caused by the thickness of the specimen, the resolution performance in the vertical (z) direction at the left end of the upper column is the 1 to 2 μm whereas that at the left end of the lower column is the 3 to 4 μm. When it is larger than the upper limit of Condition 25, the net-hole structure of a fine cube, such as neuron and the like cannot be correctly detected and it becomes remarkably difficult to observe finer spines of approximately 1 μm could not de detected.

When comparing images obtained by increasing the observation depth from the specimen surface (Z=0 μm), the influence of the spherical aberration caused by the thickness of the specimen can be understood.

The immersion microscope objective corresponding to the upper column is provided with a spherical aberration correcting means as an example of the spherical aberration correcting mechanism and the spherical aberration is sufficiently corrected in each observation depth. The immersion microscope objective corresponding to the lower column is provided with no spherical aberration correcting mechanism.

As shown in the upper column, the resolution performance in the vertical (z) direction does not change from that on the specimen surface (Z=0 μm) before the observation depth reaches 1200 μm (Z=1200 μm).

However, as shown in the lower column, the deeper the observation depth is, the more the resolution performance deteriorates. Around 1000 μm the resolution performance deteriorates up to 5 to 8 μm being double that of the specimen surface. When the resolution performance deteriorates up to this point, a fine brain structure cannot be detected.

Furthermore, the deterioration of the resolution performance greatly affects the brightness of an obtained image. For example, since in two-photon excitation, an excitation phenomenon occurs at a probability proportional to the square of the intensity of excited light. This is because if the excitation density of the focus point deteriorates, the excitation probability drops in proportion to the square of the drop of the excitation density.

Thus, it is very important to secure good resolution performance from in the specimen surface observation to in the depth observation by the spherical aberration correcting means in the acquisition of high-resolution and bright multiphoton fluorescence images.

The invention being thus described, it will be obvious that the same may be varied in many ways. For example, the 'cemented' lens components referred to above may instead be formed to make surface contact instead of using cement. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An immersion microscope objective having an object side and an image side and comprising, in order from the object side:
   a first lens group having positive refractive power;
   a second lens group having positive refractive power;
   a third lens group;
   a fourth lens group having negative refractive power with its surface nearest the image side being concave; and
   a fifth lens group having positive refractive power with its surface nearest the object side being concave;
wherein
   said first lens group includes a cemented lens component formed of, in order from the object side, a lens element of positive refractive power and a meniscus lens element having its concave surface on the object side; and
   the following conditions are satisfied:

$$0.75 < h1/h0 < 1$$

$$0.4 < h2/h1 < 0.6$$

$$0.8 < h3/h1 < 1.3$$

where
   h0 is the largest ray height on any lens surface in the immersion microscope objective,
   h1 is the marginal ray height on the surface of the fourth lens group nearest the object side,
   h2 is the marginal ray height on the surface of the fourth lens group nearest the image side, and
   h3 is the marginal ray height on the surface of the fifth lens group nearest the image side.

2. The immersion microscope objective according to claim 1, wherein:
   said fourth lens group consists of a doublet;
   said fifth lens group includes at least one meniscus lens element with its concave surface on the object side; and
   the following condition is satisfied:

$$-0.5 < f4/f5 < 0$$

where
   f4 is the focal length of said fourth lens group, and
   f5 is the focal length of said fifth lens group.

3. The immersion microscope objective according to claim 1, wherein said third lens group includes a lens component that is moved along an optical axis relative to said second and fourth lens groups.

4. The immersion microscope objective according to claim 3, wherein said third lens group consists of a triplet and the following conditions are satisfied:

$$|f/f3| < 0.1$$

$$|f2/f3| < 0.6$$

where
   f2 is the focal length of said second lens group,
   f3 is the focal length of said third lens group, and
   f is the focal length of the immersion microscope objective.

5. The immersion microscope objective according to claim 3, wherein said third lens group consists of a triplet and the following condition is satisfied:

$$0.85<|\beta 3|<1.1$$

where

β3 is the magnification of said third lens group.

6. The immersion microscope objective according to claim 1, wherein said second lens group is a cemented lens group that is moved along an optical axis relative to said first and third lens groups.

7. The immersion microscope objective according to claim 6, wherein said second lens group satisfies the following conditions:

$$|f2/f3|<0.6$$

$$0.1<f/f2<0.3$$

where f2 is the focal length of said second lens group,
f3 is the focal length of said third lens group, and
f is the focal length of the immersion microscope objective.

8. The immersion microscope objective according to claim 1, wherein at least one of the first through fifth lens groups is movable along an optical axis.

9. The immersion microscope objective according to claim 1, wherein the following conditions are satisfied:

$$0.02 \text{ mm}^{-1}<(n2-n1)/ra<0.08 \text{ mm}^{-1}$$

$$0.26<dt1/f$$

$$dt2>0.4 \text{ mm}$$

where ra is the radius of curvature in mm of the cementing surface in said cemented lens included in the first lens group,
n1 is the refractive index of a first lens element from the object side of the cemented lens in the first lens group,
n2 is the refractive index of a second lens element from the object side of the cemented lens in the first lens group,
dt1 is the working distance, in mm, of the immersion microscope objective,
f is the focal length, in mm, of the immersion microscope objective, and
dt2 is the air distance, in mm, between said cemented lens component in said first lens group and a subsequent lens element in said first lens group.

10. The immersion microscope objective according to claim 1, wherein the following conditions are satisfied:

$$nd5p>1.65$$

$$25<\nu d5p<40$$

$$15<\nu pa-\nu na<40$$

where nd5p is the refractive index, at the d-line, of a positive lens element in said fifth lens group,
νd5p is the Abbe number, relative to the d-line, of a positive lens element in said fifth lens group having a refractive index of nd5p,
νpa is the average of the Abbe numbers, relative to the d-line, of lens elements of positive refractive power in the immersion microscope objective, said refractive powers being computed for the lens elements being in air, and
νna is the average of the Abbe numbers, relative to the d-line, of lens elements of negative refractive power in the immersion microscope objective, said refractive powers being computed for the lens elements being in air.

11. The immersion microscope objective according to claim 1, wherein:

lens elements constituting said immersion microscope objective are made of optical material having an internal transmittance of 50% or higher for light of 340 nm when the optical material has a thickness of 10 mm, and
the total number of lens elements is 15 or smaller.

12. The immersion microscope objective according to claim 1, wherein aberrations are corrected over the wavelength range 700 nm-1100 nm.

13. An immersion microscope objective having an object side and an image side and comprising, in the order from the object side:

a first lens group having positive refractive power;
a second lens group having positive refractive power;
a third lens group;
a fourth lens group having negative refractive power; and
a fifth lens group having positive refractive power;
wherein the following conditions are satisfied $$Do/f>10$$

$$NA \times f>6 \text{ mm}$$

where

Do is the distance in mm between a specimen surface and a mounting position of the immersion microscope objective,
NA is the object-side numerical aperture of the immersion microscope objective, and
f is the focal length in mm of the immersion microscope objective.

14. The immersion microscope objective according to claim 13, wherein at least one of the first through fifth lens groups is movable along an optical axis.

15. The immersion microscope objective according to claim 14, wherein at least one of the first through fifth lens groups is movable along an optical axis.

16. The immersion microscope objective according to claim 14, wherein at least the first and fifth lens groups are fixed and the following condition is satisfied:

$$do+di>1 \text{ mm}$$

where do is the distance in mm between said movable lens group and an adjacent lens group on the object side of the movable lens group, and
di is the distance in mm between said movable lens group and an adjacent lens group on the image side of the movable lens group.

17. The immersion microscope objective according to claim 14, wherein said movable lens group satisfies the following condition:

$$0.85<|\beta s|<1.1$$

where

βs is the magnification of said movable lens group.

18. A laser scanning microscope system comprising:

the immersion microscope objective as set forth in claim 14;
a non-confocal detection optical system;
a galvanometer minor;
a pupil projection lens; and
an imaging lens.

* * * * *